United States Patent
Nakamura et al.

[19]

[11] Patent Number: 6,127,675
[45] Date of Patent: Oct. 3, 2000

[54] LINEAR ILLUMINATION DEVICE

[75] Inventors: Tetsuroh Nakamura, Takarazuka; Kouki Hongou, Katano; Eiichiro Tanaka, Kishiwada; Shinji Fujiwara, Kobe; Takahiko Murata, Osaka; Yuka Kajita, Ikoma-gun, all of Japan

[73] Assignee: Matsushita Electric Industrial Co., Ltd., Osaka, Japan

[21] Appl. No.: 09/238,394

[22] Filed: Jan. 27, 1999

Related U.S. Application Data

[62] Division of application No. 08/608,744, Feb. 29, 1996, Pat. No. 5,969,343.

[30] Foreign Application Priority Data

Aug. 24, 1995 [JP] Japan ................................ 7-216392
Oct. 31, 1995 [JP] Japan ................................ 7-283652

[51] Int. Cl.$^7$ ........................... G02B 6/08; H04N 1/04
[52] U.S. Cl. ..................... 250/227.31; 250/227.26; 250/235; 385/116; 385/120; 358/475; 358/484; 362/223; 362/800
[58] Field of Search ................ 250/208.1, 216, 250/234, 235, 236, 227.11, 227.26, 227.31; 358/475, 478; 362/800, 223, 225, 333, 335, 336, 337, 338, 339, 555; 385/116, 120

[56] References Cited

U.S. PATENT DOCUMENTS

| | | | |
|---|---|---|---|
| 4,255,042 | 3/1981 | Armitage, Jr. et al. . | |
| 4,287,414 | 9/1981 | Soo et al. | 250/227 |
| 4,868,383 | 9/1989 | Kurtz et al. | 250/228 |
| 4,901,207 | 2/1990 | Sato et al. . | |
| 5,258,858 | 11/1993 | Chow | 358/484 |
| 5,335,158 | 8/1994 | Kaplan et al. | 362/303 |
| 5,367,596 | 11/1994 | Chow | 385/116 |
| 5,418,384 | 5/1995 | Yamana et al. . | |
| 5,499,112 | 3/1996 | Kawai et al. | 358/475 |
| 5,534,718 | 7/1996 | Chang . | |
| 5,607,227 | 3/1997 | Yasumoto et al. . | |
| 5,612,811 | 3/1997 | Aikawa et al. . | |
| 5,660,461 | 8/1997 | Igantius et al. . | |
| 5,806,955 | 9/1998 | Parkyn, Jr. et al. . | |
| 5,969,343 | 10/1999 | Nakamura et al. | 250/227.31 |

FOREIGN PATENT DOCUMENTS

| | | |
|---|---|---|
| 0 021 093 | 1/1981 | European Pat. Off. . |
| 0 607 930 | 7/1994 | European Pat. Off. . |
| 0 663 756 | 7/1995 | European Pat. Off. . |
| 61-277252 | 12/1986 | Japan . |
| 62-233974 | 10/1987 | Japan . |
| 5-14619 | 1/1993 | Japan . |
| 5-232324 | 9/1993 | Japan . |
| 6-51130 | 2/1994 | Japan . |
| 6-291935 | 10/1994 | Japan . |
| 90/02971 | 3/1990 | WIPO . |
| 91/117626 | 11/1991 | WIPO . |
| 93/23950 | 11/1993 | WIPO . |

OTHER PUBLICATIONS

European Search Report dated Oct. 8, 1996.
European Search Report dated Feb. 27, 1997.

*Primary Examiner*—John R Lee
*Attorney, Agent, or Firm*—Ratner & Prestia

[57] ABSTRACT

A linear illumination device of the present invention includes: a guide made of a light transmitting material extending in a first direction, having a side face and at least one end face; at least one light emitter for allowing light to enter interior of the guide from the at least one end face of the guide; and a light diffusing section formed on part of the side face of the guide, for diffusing the light incident thereon, wherein at least part of the light entering the interior of the guide goes out from part of the side face of the guide facing the light diffusing section, thereby providing substantially linear illumination light along the first direction.

21 Claims, 31 Drawing Sheets

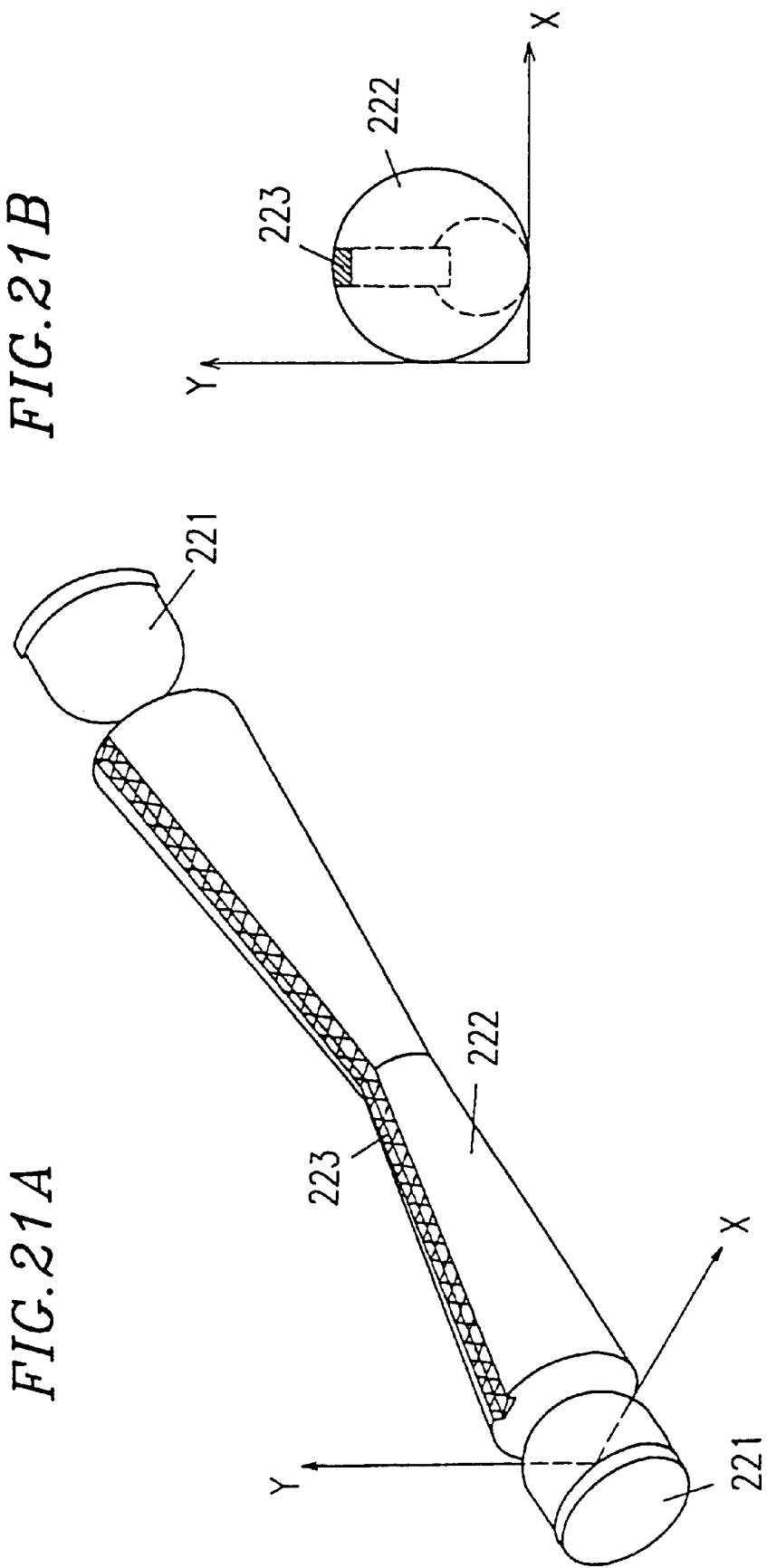

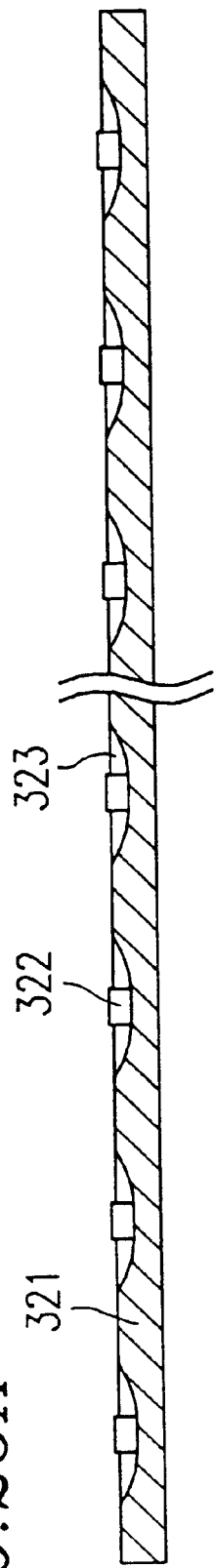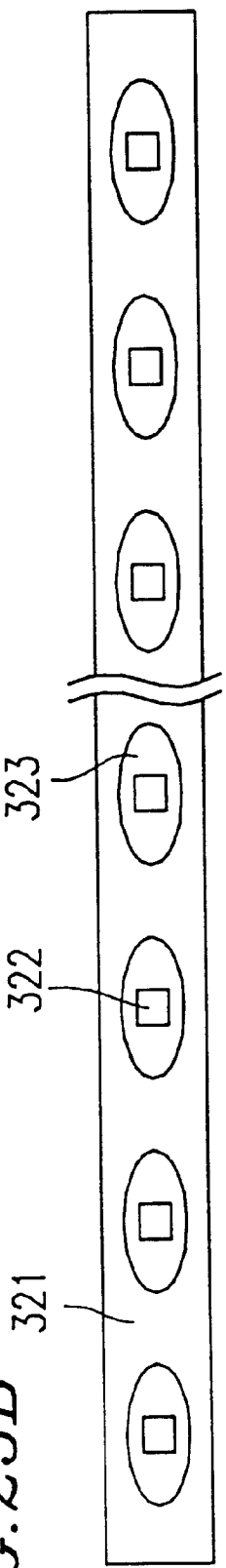
FIG.25A
FIG.25B

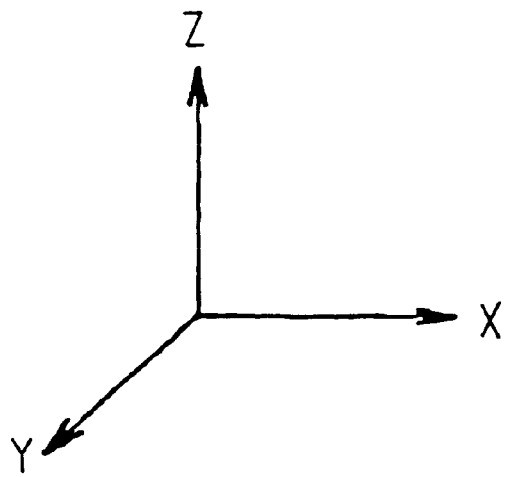
*FIG.26A*  *FIG.26B*
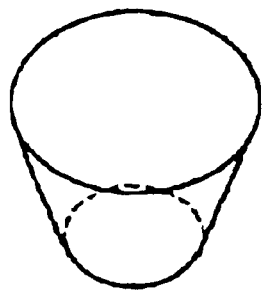 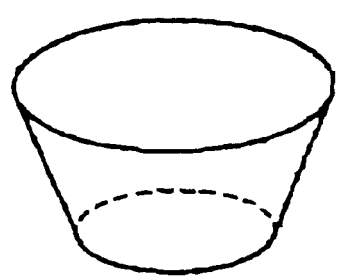
*FIG.26C*  *FIG.26D*
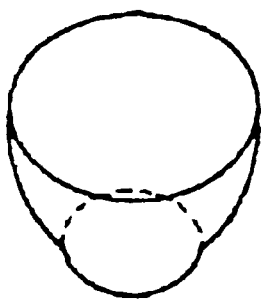 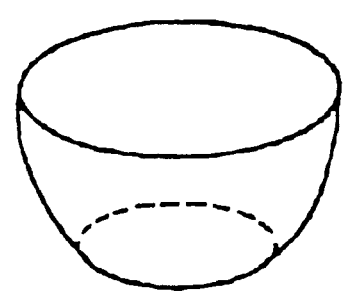
*FIG.26E*  *FIG.26F*
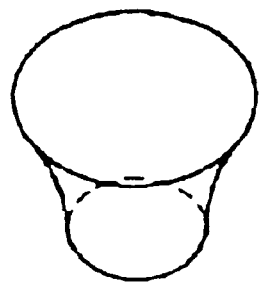 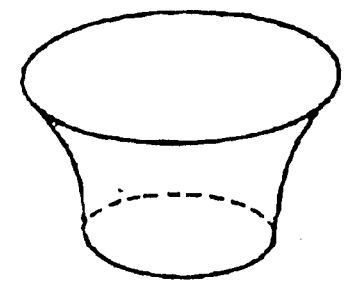

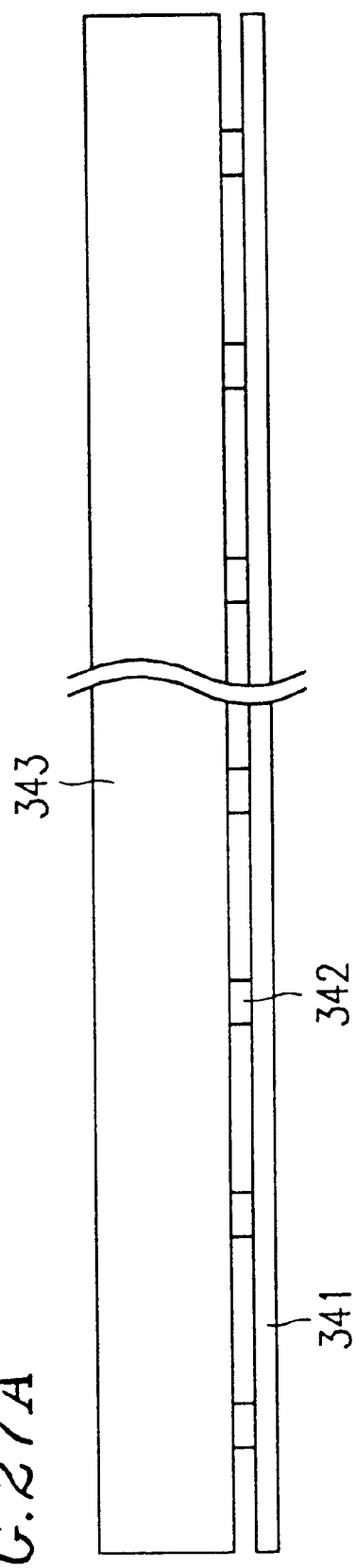
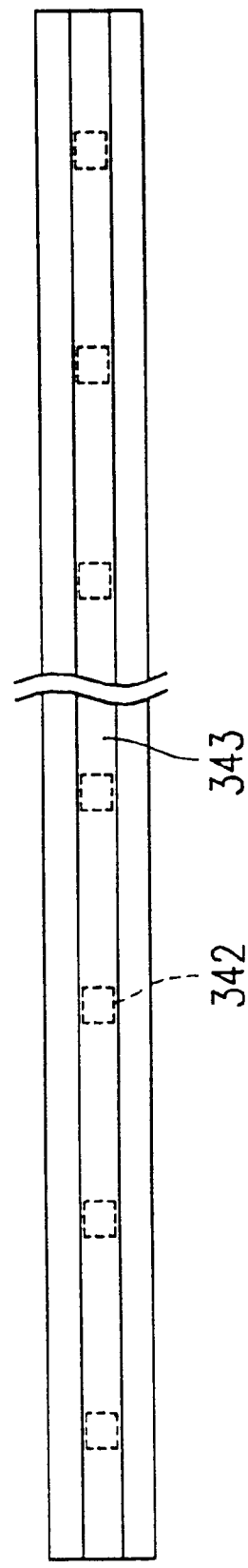
FIG.27A
FIG.27B

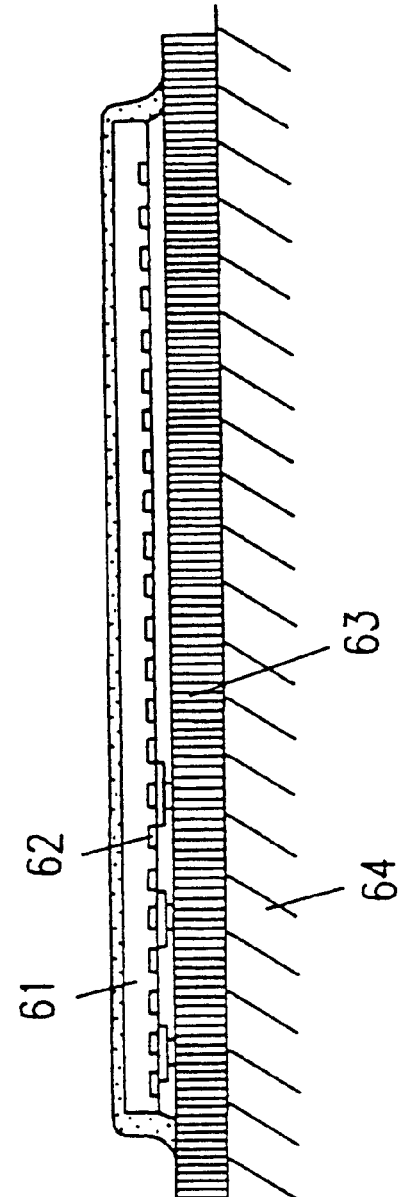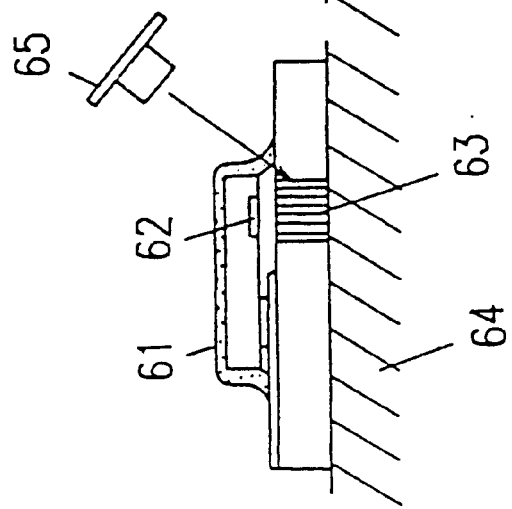

→ Main scanning direction

→ Sub-scanning direction

→ Sub-scanning direction

→ Sub-scanning direction

→ Main scanning direction

Main scanning direction

Sub-scanning direction

Main scanning direction

Sub-scanning direction

Sub-scanning direction

Sub-scanning direction

LINEAR ILLUMINATION DEVICE

This application is a division of U.S. patent application Ser. No. 08/608,744, filed on Feb. 29, 1996, now U.S. Pat. No. 5,969,343.

BACKGROUND OF THE INVENTION

1. Field of the Invention

The present invention relates to a linear illumination device for illuminating a surface of a document in an optical image reading apparatus such as a direct contact type image sensor unit.

The entire disclosure of U.S. Pat. application Ser. No. 08/608,744 filed Feb. 29, 1996, now U.S. Pat. No. 5,969,343, is expressly incorporated by reference herein.

2. Description of the Related Art

Optical image reading apparatuses have been widely used in apparatuses such as a compact facsimile machine or a bar cord reader which optionally read a document. Such an optical image reading apparatus illuminates the document, receives the light reflected by the document, and then obtains electric signals corresponding to an image on the document in accordance with the amount of the reflected light. As an illumination device of the apparatus of this kind, an LED array constituted by LED chips arranged in a line is used.

With reference to the drawings, an example of the conventional linear illumination device used as the optical image reading apparatus will be described.

FIG. 28 shows the configuration of a conventional optical image reading apparatus. In FIG. 28, a document 141 is placed below the optical image reading apparatus. The optical image reading apparatus includes: an LED array as a linear illumination device 142 for illuminating the document 141; a rod lens array 143 for focusing light beams reflected by the document 141; and a photoelectric conversion element array 144 for receiving the focused light beams so as to convert the light beams into electric signals. As shown in FIG. 29, the LED array is constituted by arranging a plurality of LED chips 152 in a linear manner on a substrate 151 on which a circuit conductor layer is formed.

The operations of the optical image reading apparatus and the linear illumination device having the above configurations will be described below.

First, light beams emitted from the LED array 142 are radiated onto the document 141 to be read. The light beams reflected from the document 141 are focused by the rod lens array 143, and then are directed to the photoelectric conversation element array 144 so as to convert the light beams into electric signals corresponding to an image on the document 141.

In general, the document 141 is optically read while the optical image reading apparatus is scanning the document 141. In the case of using the LED array 142 as the illumination device, a direction along which the document 141 is scanned (hereinafter, simply referred to as a sub-scanning direction) is perpendicular to a direction in which the LED chips are arranged. In order to accurately read the document 141, the optical image reading apparatus requires that the illumination device illuminates a portion of the document 141 with a narrow width in the sub-scanning direction. In addition, illumination is required to be uniform in a direction perpendicular to the sub-scanning direction (hereinafter, referred to as a main scanning direction).

In the case of using the LED array 142, however, it is difficult to illuminate the document 141 uniformly in the main scanning direction due to variation in the amount of light emitted from each of the LED chips 152 and effects of the directionality thereof. In order to reduce the adverse effect of the directionality of the LED chips 152, the number of the LED chips 152 needs to be increased. Alternatively, when the distance between the surface of the document 141 and the LED array 142 is made larger, the effects of the directionality of the LED chips 152 can be reduced. For example, in the case where an array of 24 LED chips is used as the illumination device, the distance between the document and the LED array should be set to be 9–10 mm in order to illuminate an A4 sized document with a satisfactory uniform light.

If illumination is not uniform in the main scanning direction, the electric signals obtained in accordance with the amount of light received by the photoelectric conversion element array 144 are also poor in uniformity (PRNU). The poor uniformity of the electric signals increases the production cost of the optical image reading apparatus in the case where the obtained electric signals are subjected to a signal correction processing (for example, shading correction). In addition, the electric signals with poor uniformity burden the signal correction processing ability. On the other hand, in the case where the signal correction processing is not performed, for example, when a uniformly gray document is read by the optical image reading apparatus, a brightly illuminated part may be displayed as white. Likewise, an insufficiently illuminated dark part may be displayed as black.

FIGS. 31A and 31B show cross-sectional views of a direct contact type image sensor unit using the above-mentioned conventional illumination device. A document 64 is placed so as to be in close contact with one end of an optical fiber array 63 and is irradiated with light from an LED array 65 placed above. The reflected light which carries information of the document is directed toward a light receiving array 62 which is provided on the other end of the optical fiber array 63 so as to be converted into image signals.

In the image sensor unit as described above, however, illuminance on the surface of the document greatly varies since the LED array 65 is used as the illumination device. Therefore, since sensitivity of the sensor varies greatly, image reading performance is deteriorated. Moreover, since it is necessary to space the document 64 from the LED array 65 as described above, the unit itself becomes large. Therefore, a larger number of LED chips are required, thereby raising the cost of the unit.

Moreover, when the LED array 65 is brought closer to the surface of the document 64 in order to increase an S/N ratio, PRNU of the electric signals are further deteriorated due to the adverse effect of the directionality of each of the LED chips.

Next, another example of a conventional optical image reading apparatus will be described with reference to FIG. 30.

FIG. 30 shows the configuration of another conventional optical color image reading apparatus. In FIG. 30, three fluorescent lamps 142R, 142G and 142B are used as an illumination device. The three fluorescent lamps 142R, 142G and 142B are respectively for red light, green light and blue light (hereinafter, respectively referred to simply as R, G and B). The fluorescent lamps 142R, 142G and 142B are each lit separately in a time divided manner. A colored light beam emitted from one of the respective fluorescent lamps is reflected by a document 141 so as to be focused onto a photoelectric conversion element array 144 by a rod lens array 143. The photoelectric conversion element array 144 receives the focused light beam to convert it into an electric signal. The operation is successively repeated for R, G and B, thereby allowing the color of the document 141 to be analyzed.

In this configuration, the document 141 can be illuminated uniformly in the main scanning direction. However, the three fluorescent lamps 142R, 142G and 142B respectively corresponding to R, G and B are required, making it difficult to realize low cost and reduction in size of the optical color image reading apparatus.

SUMMARY OF THE INVENTION

The linear illumination device of this invention, includes: a guide made of a light transmitting material extending in a first direction, having a side face and at least one end face; light emitting means for allowing light to enter interior of the guide from the at least one end face of the guide; and a light diffusing section formed on part of the side face of the guide, for diffusing the light incident thereon, wherein at least part of the light entering the interior of the guide goes out from part of the side face of the guide facing the light diffusing section, thereby providing substantially linear illumination light along the first direction.

In one embodiment of the present invention, the light transmitting material has a light transmittance of 80% or more (according to ASTM measuring method D1003).

In another embodiment of the present invention, a refractive index of the light transmitting material is substantially in the range of 1.4 to 1.7.

In still another embodiment of the present invention, the light transmitting material is acrylic.

In still another embodiment of the present invention, the light transmitting material is polycarbonate.

In still another embodiment of the present invention, the guide has two end faces opposing each other, and the light emitting means includes two light emitters for allowing the light to enter the guide from the two end faces.

In still another embodiment of the present invention, the guide has two end faces opposing each other, and the light emitting means allows the light to enter the guide from one of the two end faces, the other end face being a mirror face or a reflective face.

In still another embodiment of the present invention, the light diffusing section includes a groove formed on part of the side face of the guide and a light diffusing layer provided on the groove.

In still another embodiment of the present invention, the light diffusing section has a rough surface.

In still another embodiment of the present invention, the light diffusing section has center line average roughness Ra is in the range of (100 to 0.013)a and the maximum height Rmax is in the range of (400 to 0.05)S in terms of surface roughness indicated in JIS standard B0601.

In still another embodiment of the present invention, a surface of the light diffusing section has a triangular wave shape or a sawtooth shape.

In still another embodiment of the present invention, a surface of the light diffusing section has a triangular wave shape having a pitch in the range of 50 $\mu$m to 2000 $\mu$m and a height at a peak in the range of 20 $\mu$m to 800 $\mu$m.

In still another embodiment of the present invention, the light diffusing section is formed on part of the side face of the guide as one continuous part in the first direction.

In still another embodiment of the present invention, the light diffusing section is formed on part of the side face of the guide at intervals in the first direction.

In still another embodiment of the present invention, a total reflection layer is formed on the entire side face of the guide excluding the light diffusing section and part facing the light diffusing section.

In still another embodiment of the present invention, the light diffusing section is a diffusing layer.

In still another embodiment of the present invention, the diffusing layer is made of a light diffuser and a light transmitting resin.

In still another embodiment of the present invention, a refractive index of the light diffuser is larger than that of the guide.

In still another embodiment of the present invention, a refractive index of the light transmitting resin is substantially equal to that of the guide.

In still another embodiment of the present invention, the light diffuser is $TiO_2$.

In still another embodiment of the present invention, the light diffuser is $TiO_2$, and the light transmitting resin is a silicon resin.

In still another embodiment of the present invention, the light emitting means has at least one light emitting diode.

In still another embodiment of the present invention, each of the two light emitters has at least one light emitting diode.

In still another embodiment of the present invention, the light emitting means has a light emitting angle distribution in the range of 30 to 150 degrees.

In still another embodiment of the present invention, the guide has a pillar shape extending in the first direction.

In still another embodiment of the present invention, the light diffuser is formed in the first direction as one continuous part.

In still another embodiment of the present invention, a width of the light diffusing section in a second direction is constant, the second direction being perpendicular to the first direction.

In still another embodiment of the present invention, a width of the light diffusing section in a second direction perpendicular to the first direction gradually increases as approaching a central portion of the guide from the two end faces.

In still another embodiment of the present invention, the light diffusing section is formed at constant intervals in the first direction.

In still another embodiment of the present invention, the light diffusing section is formed in a constant shape.

In still another embodiment of the present invention, an area of the light diffusing section gradually increases as approaching a central portion from the two end faces.

In still another embodiment of the present invention, the light diffusing section is formed in the first direction at intervals, the intervals gradually decreasing as approaching a central portion from the two end faces of the guide.

In still another embodiment of the present invention, the light diffusing section is made of a light diffuser and a light transmitting resin.

In still another embodiment of the present invention, a linear illumination device further includes a diffusing layer formed on an entire surface or part of the light diffusing section.

In still another embodiment of the present invention, the guide has a polygonal pillar shape.

In still another embodiment of the present invention, the guide has a cylindrical shape.

In still, another embodiment of the present invention, two planes forming a predetermined angle therebetween are provided in part of the side face of the guide facing the light diffusing section.

In still another embodiment of the present invention, the predetermined angle is 90 degrees.

In still another embodiment of the present invention, a V-shaped cut face, which has such a shape that a width and a depth in a second direction perpendicular to the first direction gradually increase as approaching a central portion of the guide from the two end faces, is formed on the side face of the guide.

In still another embodiment of the present invention, the light diffusing section is formed on an entire surface or part of the V-shape cut face.

In still another embodiment of the present invention, the guide has such a shape that a cross-sectional area of the guide gradually decreases as approaching a central portion between the two end faces.

In still another embodiment of the present invention, a cross-section of the guide has a similar shape as that of each of the two end faces, and each of the two end faces has a polygonal cross-section.

In still another embodiment of the present invention, a cross-section of the guide has a similar shape to that of each of the two end faces, and each of the two end faces has a circular cross-section.

In still another embodiment of the present invention, the side face of the guide contains a straight line parallel to the first direction, the straight lie connecting a point on a circumference of one of the end faces to a corresponding point on a circumference of the other of the end faces.

In still another embodiment of the present invention, the guide has a circular cross-section.

In still another embodiment of the present invention, part of the side face of the guide facing the light diffusing section contains the straight line, and at least part of the light beams goes out from a vicinity of the straight line.

In still another embodiment of the present invention, an area of a cross-section of a central portion of the guide is 70% or less of an area of each of the two end faces.

In still another embodiment of the present invention, the light emitting means emits read light, green light and blue light in a time divided manner.

In still another embodiment of the present invention, the light emitting means emits red light, green light and blue light in a time divided manner.

In still another embodiment of the present invention, the light emitting means includes three light emitting diodes respectively emitting the red light, the green light and the blue light.

According to another aspect of this invention, a direct contact type image sensor unit of this invention includes: an optical fiber array including a plurality of optical fibers; a transparent plate placed so as to be in contact with the optical fiber array, which has two end faces; a pair of opaque substrates placed so as to interpose the optical fiber array and the transparent plate therebetween; light emitting means for allowing light to be incident on the transparent plate from one of the two end faces of the transparent plate; a light blocking layer formed on the other of the two end faces of the transparent plate; and a light receiving element array including a plurality of light receiving elements provided on one ends of the plurality of optical fibers, wherein the light emitting means is a linear illumination device as claimed in claim 1 and emits linear illumination light to a document along the first direction.

In one embodiment of the present invention, each of the plurality of optical fibers has a core, a cladding layer provided on an outer surface of the core, and a light absorbing layer provided on an outer surface of the cladding layer.

In another embodiment of the present invention, a direct contact type image sensor further comprising lens means disposed between one of the two end faces of the transparent plate and the light emitting means, wherein the lens means converges the illumination light only in a second direction perpendicular to the first direction.

In still another embodiment of the present invention, the guide of the linear illumination device has two end faces, a cross-section of the guide perpendicularly crossing the first direction being similar to that of each of the two end faces, an area of the cross-section of the guide gradually decreasing as approaching a central portion from the two end faces, and wherein the light emitting means allows the light to enter the guide from the both end faces, and the light diffusing layer is formed in the first direction as one continuous part.

In still another embodiment of the present invention, a width of the light diffusing layer in a second direction perpendicular to the first direction gradually increasing as approaching the central portion between the two end faces of the guide.

In still another embodiment of the present invention, a width of the light diffusing layer in a second direction perpendicular to the first direction is constant.

In still another embodiment of the present invention, a side of the guide contains a straight line which is obtained by connecting corresponding points of the two end faces and substantially parallel to the first direction, a vicinity of the straight line of the side faces one of the two end faces of the transparent plate, and the illumination light is emitted from the vicinity of the straight line.

In still another embodiment of the present invention, the guide has a circular cross-section.

In still another embodiment of the present invention, the guide has two end faces and a pillar shape extending in the first direction and a constant shape of a cross-section perpendicularly crossing the first direction, and wherein the light emitting means allows the light to enter interior of the guide between both two end faces, and the light diffusing layer is formed in the first direction as one continuous part.

In still another embodiment of the present invention, a width in a second direction perpendicularly crossing the first direction of the light diffusing layer gradually increases as approaching a central portion of the guide between the two end faces to be maximum in the central portion.

In still another embodiment of the present invention, a cross-section of the guide perpendicularly crossing the first direction is circular.

In still another embodiment of the present invention, a refractive index of the guide of the linear illumination device is substantially equal to that of the transparent plate.

In still another embodiment of the present invention, a material of the transparent plate is the same as the light transmitting material forming the guide of the linear illumination device.

In still another embodiment of the present invention, the linear illumination device is connected to the transparent plate using a transparent resin having substantially the same refractive index as those of the guide and the transparent plate, while optically matching the guide and the transparent plate.

In still another embodiment of the present invention, a refractive index of the lens means is substantially the same as that of the transparent plate.

In still another embodiment of the present invention, the lens means and the transparent plate are made of the same material.

In still another embodiment of the present invention, the lens means is connected to the transparent plate using a transparent resin having substantially the same refractive index as those of the lens means and the transparent plate, while optically matching the lens means and the transparent plate.

In still another embodiment of the present invention, the light emitting means has at least one light emitting diode.

In still another embodiment of the present invention, the light emitting means has three light emitting diodes respectively emitting red light, green light and blue light.

In still another embodiment of the present invention, an angle at which the illumination light from the linear illumination device is incident on the document is in the range of 0 to 50 degrees.

Alternatively, the linear illumination device of this invention includes: a substrate extending in a first direction; a light emitting array provided on the substrate and arranged in the first direction; and a fiber array plate having a plurality of groups of fibers placed so as to respectively correspond to light emitting elements of the array, wherein light from each of the light emitting elements is incident on a side face of a corresponding group of the fibers and goes out from the other side face, thereby irradiating a document placed so as to face the light emitting element array with linear illumination light along the first direction.

In one embodiment of the invention, a plurality of concavities are formed on a face of the substrate on which the light emitting array is provided, each of the light emitting elements is provided on a bottom face of a corresponding one of the concavities, and the bottom face and a side face of each of the concavities are reflective faces or mirror faces.

Further alternatively, the linear illumination device of this invention for irradiating a document provided so as to face the light emitting element array with linear illumination light along a first direction, includes: a substrate extending in the first direction; and a light emitting array provided on the substrate and arranged in the first direction, wherein a plurality of concavities are formed on a face of the substrate on which the light emitting array is provided, each of the light emitting elements is provided on a bottom face of a corresponding one of the concavities, and the bottom face and a side face of each of the concavities are reflective faces or mirror faces.

In one embodiment of the present invention, a linear illumination device further includes a transparent plate provided on the light emitting element array, wherein the first direction is parallel to a main scanning direction of the document, a length of the transparent plate in the main scanning direction is substantially the same as that of the light emitting element array, at least a part of the transparent plate has a length in a sub-scanning direction of the document which is substantially the same as that of each of the light emitting elements in the second direction, and a length of the transparent plate in a direction, which is perpendicular to both the main scanning direction and the sub-scanning direction is substantially the same as a distance between the light emitting element array and the document.

Further alternatively, a linear illumination device for irradiating a document provided so as to face the light emitting element array with linear illumination light along a first direction, includes: a substrate extending in the first direction; a light emitting array provided on the substrate and arranged in the first direction; and a transparent plate provided on the light emitting element array, wherein the first direction is parallel to a main scanning direction of the document, a length of the transparent plate in the main scanning direction is substantially the same as that of the light emitting element array, at least a part of the transparent plate has a length in a sub-scanning direction of the document which is substantially the same as that of each of the light emitting elements in the second direction, and a length of the transparent plate in a direction, which is perpendicular to both the main scanning direction and the sub-scanning direction, is substantially the same as a distance between the light emitting element array and the document.

In one embodiment of the present invention, the first direction is parallel to a main scanning direction of the document, and each of the concavities has an inverse cone shape having a direction perpendicular to the main scanning direction and a sub-scanning direction of the document as an axis.

In another embodiment of the present invention, the first direction is parallel to a main scanning direction of the document, and each of the concavities has an inverse ellipsoidal cone shape which has a direction perpendicular to the main scanning direction and a sub-scanning direction of the document as an axis and is longer in the main scanning direction.

In still another embodiment of the present invention, the first direction is parallel to a main scanning direction of the document, and each of the concavities has a truncated cone shape of revolution obtained by circularly rotating a parabola (quadratic curve) about a direction perpendicular to the main scanning direction and a sub-scanning direction of the document as an axis.

In still another embodiment of the present invention, the first direction is parallel to a main scanning direction of the document, and each of the concavities has a truncated cone shape of revolution obtained by elliptically rotating a parabola (quadratic curve) about a direction perpendicular to the main scanning direction and a sub-scanning direction of the document as an axis.

In still another embodiment of the present invention, the first direction is parallel to a main scanning direction of the document, and each of the concavities has a truncated cone shape of revolution obtained by circularly rotating a cubic curve or a higher multidimensional curve about a direction perpendicular to the main scanning direction and a sub-scanning direction of the document as an axis.

In still another embodiment of the present invention, the first direction is parallel to a main scanning direction of the document, and each of the concavities has a truncated cone shape of revolution obtained by elliptically rotating a cubic curve or a higher multidimensional curve about a direction perpendicular to the main scanning direction and a sub-scanning direction of the document as an axis.

In still another embodiment of the present invention, the first direction is parallel to a main scanning direction of the document, and each of the concavities has a truncated cone shape of revolution obtained by circularly rotating an arbitrary curve about a direction perpendicular to the main scanning direction and a sub-scanning direction of the document as an axis.

In still another embodiment of the present invention, the first direction is parallel to a main scanning direction of the document, and each of the concavities has a truncated cone shape of revolution obtained by elliptically rotating an arbitrary curve about a direction perpendicular to the main scanning direction and a sub-scanning direction of the document as an axis.

In still another embodiment of the present invention, the first direction is parallel to a main scanning direction of the document, and each of the concavities has an inverse truncated cone shape having a third direction perpendicular to the main scanning direction and a sub-scanning direction of the document as an axis.

In still another embodiment of the present invention, the first direction is parallel to a main scanning direction of the document, and each of the concavities has an inverse ellipsoidal truncated cone shape which has a third direction perpendicular to the main scanning direction and a sub-scanning direction of the document as an axis and is longer in the main scanning direction.

In still another embodiment of the present invention, the transparent plate has a first face adjacent to the light emitting element array and a second face facing the first face, the first face being a triangular wave face or a sawtooth face having a first predetermined angle and a first predetermined pitch.

In still another embodiment of the present invention, the transparent plate has a first face adjacent to the light emitting element array and a second face facing the first face, the second face being a triangular wave face or a sawtooth face having a second predetermined angle and a second predetermined pitch.

In still another embodiment of the present invention, the second face is a triangular wave face or a sawtooth face having a second predetermined angle and a second predetermined pitch.

In still another embodiment of the present invention, the transparent plate has a first face adjacent to the light emitting element array and a second face facing the first face, and part of a cross-section of the transparent plate along the sub-scanning direction, facing the second face is a curved face.

In still another embodiment of the present invention, the transparent plate has a first face adjacent to the light emitting element array and a second face facing the first face, and a length of the transparent plate in the sub-scanning direction gradually decreases from the first face toward the second face.

In still another embodiment of the present invention, the transparent plate has a first face adjacent to the light emitting element array and a second face facing the first face, and the transparent plate includes a first part containing the first face and having a constant width in the sub-scanning direction and a second part containing the second face and having a width in the sub-scanning direction gradually decreasing in a direction away from the light emitting element array, which is further from the light emitting element array than the first part, whereby the second face forms a predetermined angle with respect to the first face.

In still another embodiment of the present invention, the transparent plate includes a plurality of regions having a different refractive index from that of a periphery thereof therein, thereby diffusing light from the light emitting element array incident on the transparent plate so as to emit the light as the illumination light.

In still another embodiment of the present invention, the plurality of regions are a plurality of cavities formed in the transparent plate.

In still another embodiment of the present invention, each of the plurality of cavities has a cylindrical shape having an axis in the sub-scanning direction.

In still another embodiment of the present invention, the transparent plate has a first face adjacent to the light emitting element array and a second face facing the first face, each of the plurality of cavities has a triangular prism shape having an axis in the sub-scanning direction, one side face of the triangular prism opposes the first face, and an edge opposing the side face is closer to the first face than the side face.

In still another embodiment of the present invention, the transparent plate has a first face adjacent to the light emitting element array and a second face opposing the first face, the first face being a triangular wave face or a sawtooth face having a first predetermined angle and a first predetermined pitch.

In still another embodiment of the present invention, the transparent plate has a first face adjacent to the light emitting element array and a second face opposing the first face, the second face being a triangular wave face or a sawtooth face having a second predetermined angle and a second predetermined pitch.

In still another embodiment of the present invention, the second face is a triangular wave face or a sawtooth face having a second predetermined angle and a second predetermined pitch.

In still another embodiment of the present invention, the transparent plate has a first face adjacent to the light emitting element array and a second face opposing the first face, part of a cross-section of the transparent plate along the sub-scanning direction is a curved face.

In still another embodiment of the present invention, the transparent plate has a first face adjacent to the light emitting element array and a second face opposing the first face, and a length of the transparent plate in the sub-scanning direction gradually decreases as approaching the second face from the first face.

In still another embodiment of the present invention, the transparent plate has a first face adjacent to the light emitting element array and a second face facing the first face, wherein the transparent plate includes a first part containing the first face and having a constant width in the sub-scanning direction and a second part containing the second face and having a width in the sub-scanning direction gradually decreasing as in a direction away from the light emitting element array, which is further from the light emitting element array than the first part, whereby the second face forms a predetermined angle with respect to the first face.

In still another embodiment of the present invention, the transparent plate includes a plurality of regions having a different refractive index from that of a periphery thereof therein, thereby diffusing light from the light emitting element array incident on the transparent plate so as to emit the light as the illumination light.

In still another embodiment of the present invention, the plurality of regions are a plurality of cavities formed in the transparent plate.

In still another embodiment of the present invention, each of the plurality of cavities has a cylindrical shape having an axis in the sub-scanning direction.

In still another embodiment of the present invention, the transparent plate has a first face adjacent to the light emitting element array and a second face facing the first face, each of the plurality of cavities has a triangular prism shape having an axis in the sub-scanning direction, one side face of the triangular prism opposes the first face and an edge opposing the side face is closer to the first face than the side face.

Further alternatively, the linear illumination device of this invention for radiating linear illumination light along a first direction onto a document provided so as to oppose to a light emitting element array, includes: a substrate extending in the first direction; the light emitting element array provided on the substrate and arranged in the first direction; a first transparent plate provided on the light emitting element array, which extends in the first direction; and a second transparent plate provided on the light emitting element array, which extends in the first direction, wherein the first direction is parallel to a main scanning direction of the document, and wherein lengths of the first transparent plate and the second transparent plate in the respective main scanning directions are substantially identical with a length of the light emitting element array, lengths of parts of the first transparent plate and the second transparent plate are substantially identical with a length in the sub-scanning direction of each of the light emitting elements, and a sum of the length of the first transparent plate and the length of the second transparent plate is substantially equal to a distance between the light emitting element array and the document in a direction perpendicular to both the main scanning direction and the sub-scanning direction.

In one embodiment of the invention, the first transparent plate has a first face adjacent to the light emitting element array and a second face opposing to the first face, and the second face is a triangular wave face or a sawtooth face having a predetermined angle and a predetermined pitch.

In another embodiment of the invention, the second transparent plate has a first face adjacent to the first transparent plate, and the first plate is a triangular wave face or a sawtooth face having a predetermined angle and a predetermined pitch.

In still another embodiment of the invention, the second transparent plate has a face adjacent to the first transparent plate and a face opposing thereto, and part of a cross-section along the sub-scanning direction of the second transparent plate, corresponding to the opposing face is a curved face.

In still another embodiment of the invention, the second transparent plate has a second face opposing to the first face, and part of a cross-section along the sub-scanning direction of the second transparent plate, corresponding to the second face is a curved face.

In still another embodiment of the invention, a length of at least one of the first transparent plate and the second transparent plate in the sub-scanning direction decreases as moving away from the light emitting elements.

In still another embodiment of the invention, the second transparent plate has a face adjacent to the first transparent plate and a face opposing thereto, and the opposing face is inclined with respect to the sub-scanning direction.

In still another embodiment of the invention, the second transparent plate has a second face opposing to the first face, and the second face is inclined with respect to the sub-scanning direction.

In still another embodiment of the invention, at least one of the first transparent plate and the second transparent plate includes a plurality of regions having a different refractive index from that of a periphery thereof therein, thereby diffusing light from the light emitting element array incident on the at least one of the first transparent plate and the second transparent plate so as to emit the light as the illumination light.

In still another embodiment of the invention, the plurality of regions are a plurality of cavities formed in the at least one of the first transparent plate and the second transparent plate.

In still another embodiment of the invention, each of the plurality of cavities has a cylindrical shape having an axis in the sub-scanning direction.

In still another embodiment of the invention, each of the plurality of cavities has a triangular prism shape having an axis in the sub-scanning direction, one side face of the triangular prism opposes to the first face, and an edge opposing the side face is closer to the first face than the side face.

In still another embodiment of the invention, a plurality of concavities are formed on a face of the substrate on which the light emitting array is provided, a bottom face and a side face of each of the concavities are reflective faces or mirror faces, and each of the light emitting elements is provided on the bottom face of a corresponding one of the concavities.

Thus, the invention described herein makes possible the advantages of: (1) providing a compact linear illumination device of an optical image reading apparatus, which has a simple configuration and is capable of reducing the cost; (2) providing a linear illumination device with high efficiency to a surface of a document and small nonuniformity of illumination of a compact and lightweight optical image reading apparatus capable of reading an image with high quality and high resolution at low cost; and (3) providing a remarkably small and lightweight direct contact type image sensor unit capable of reading with high quality, high resolution and small nonuniformity in sensitivity at low cost without causing flare light and crosstalk of light.

These and other advantages of the present invention will become apparent to those skilled in the art upon reading and understanding the following detailed description with reference to the accompanying figures.

BRIEF DESCRIPTION OF THE DRAWINGS

FIG. 21A is a schematic view showing a linear illumination device according to Example 7; and FIG. 21B is an end cross-sectional view thereof.

FIG. 25A is a cross-sectional view showing a linear illumination device according to Example 9 of the present invention; and FIG. 25B is a plan view thereof.

FIGS. 26A through 26F show various shapes of one of reflective faces according to Example 9.

FIG. 27A is a cross-sectional view showing an illumination device according to Example 10 of the present invention; and FIG. 27B is a plan view thereof.

FIGS. 31A and 31B are cross-sectional views showing a conventional image sensor unit.

DESCRIPTION OF THE PREFERRED EMBODIMENTS

Hereinafter, the present invention will be described by way of illustrative examples.

EXAMPLE 1

A linear illumination device according to Example 1 of the present invention will be described.

Figure 1:
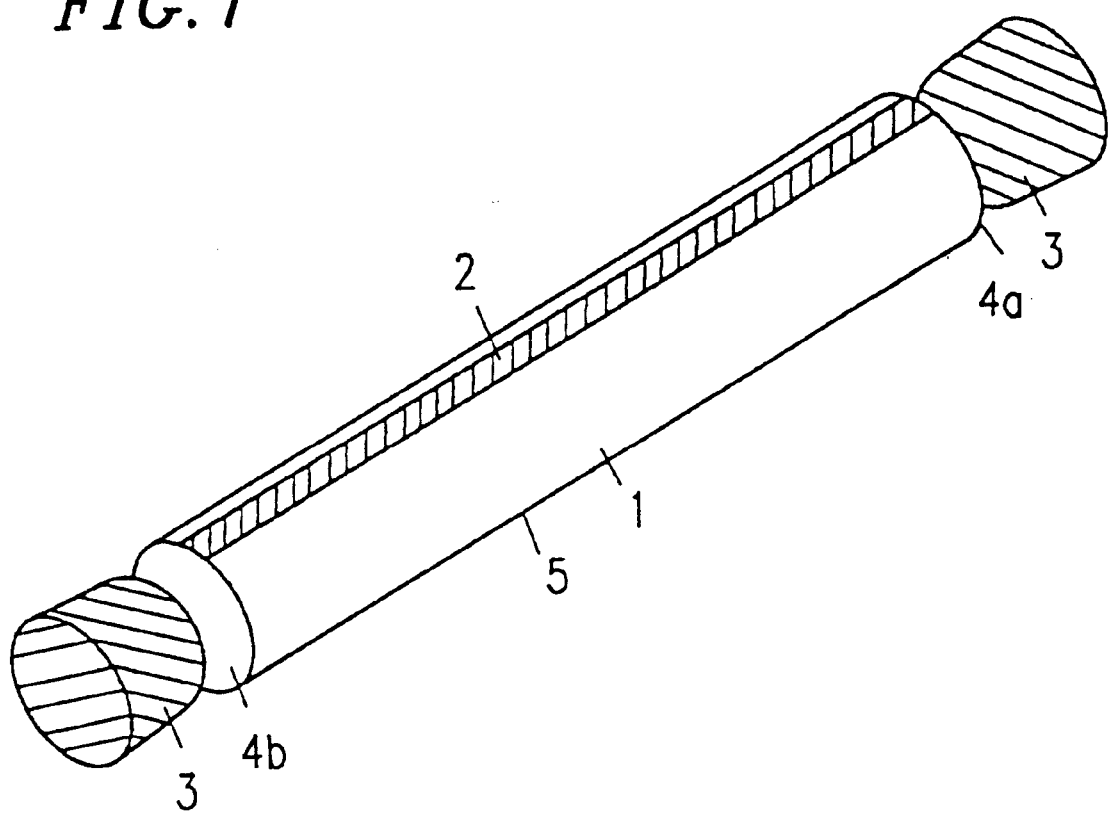
FIG. 1 is a perspective view showing a linear illumination device according to Example 1 of the present invention.
Figure 2:
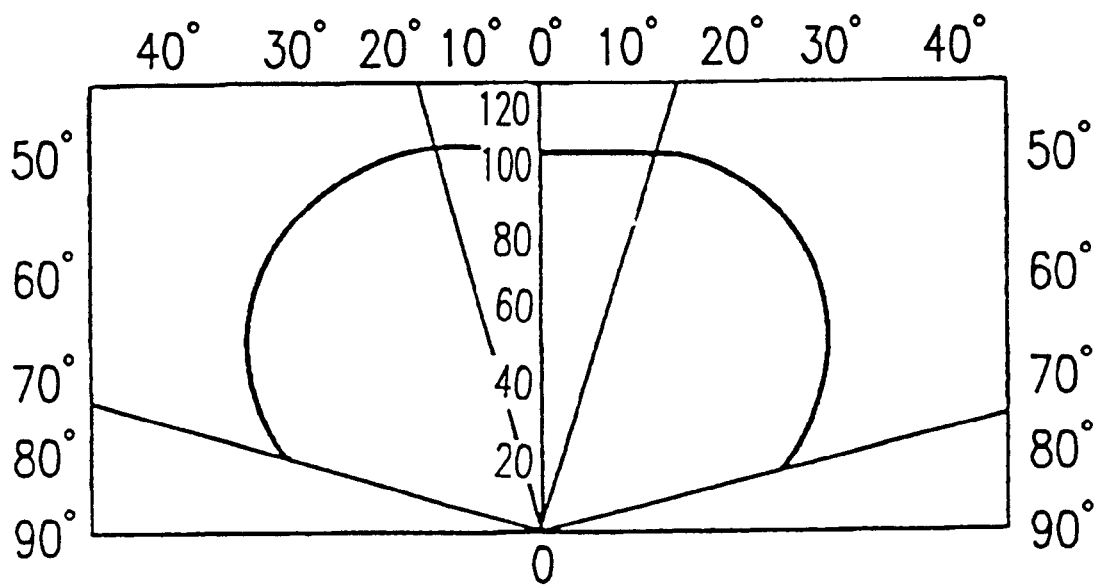
FIG. 2 is a light emitting distribution (directionality) of the light emitters according to Example 1 of the present invention.
Figure 3:
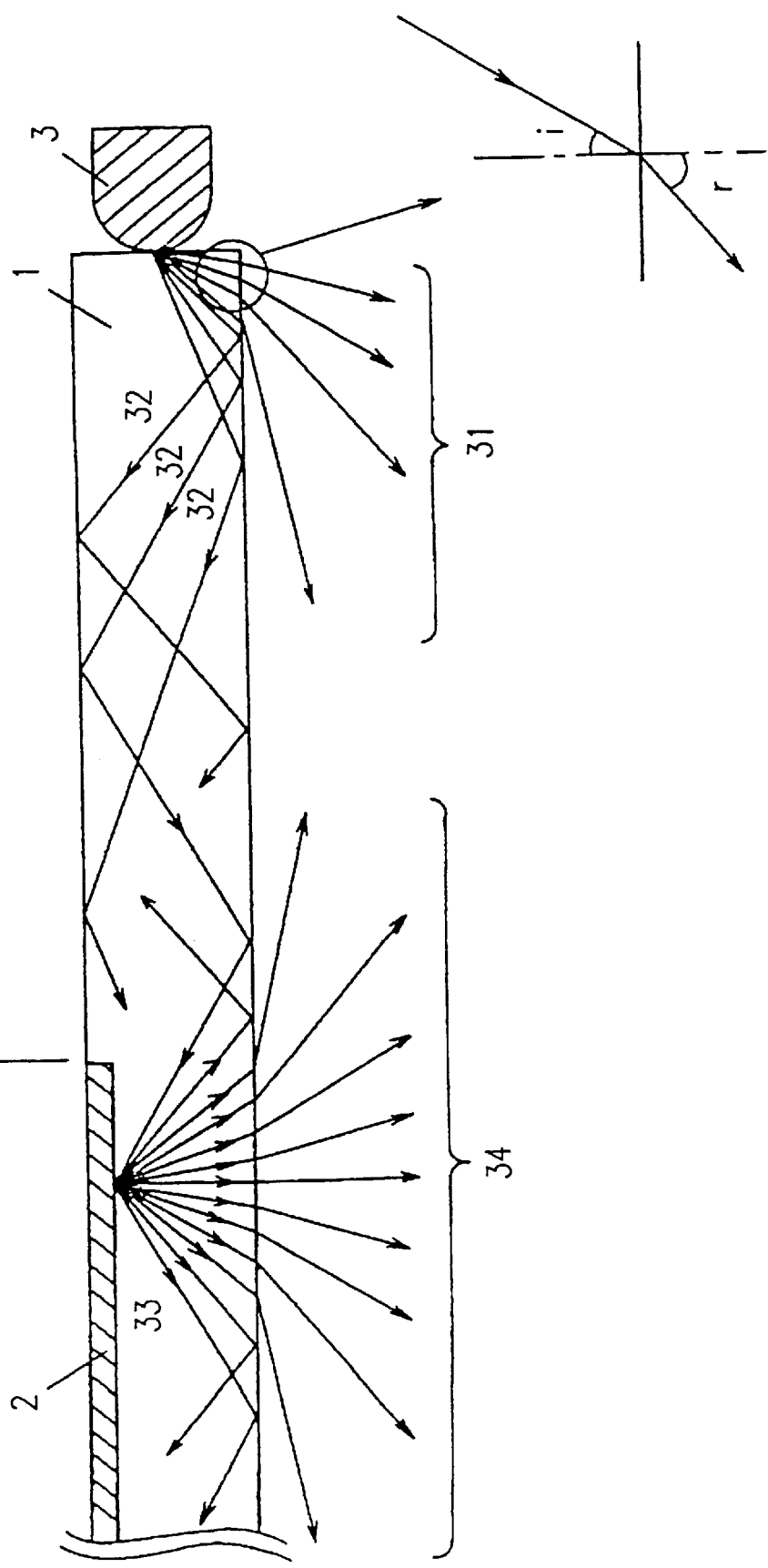
FIG. 3 is a two-dimensional view showing the behavior of light beams entering the interior of a guide according to Example 1 of the present invention.
Figure 4A:
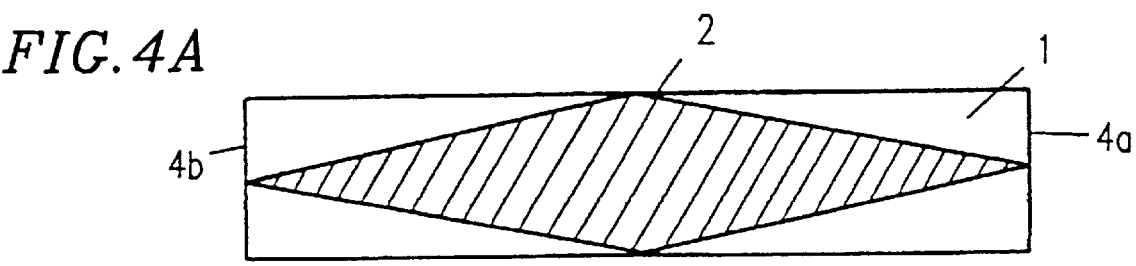
FIGS. 4A through 4E are plan views respectively showing examples of the shape of a light diffusing section according to Example 1.
Figure 4B:
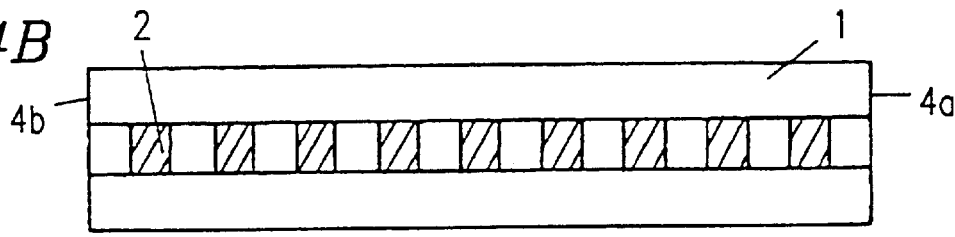
Figure 4C:
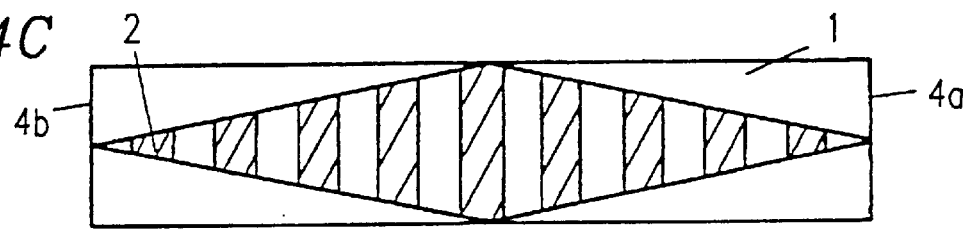
Figure 4D:
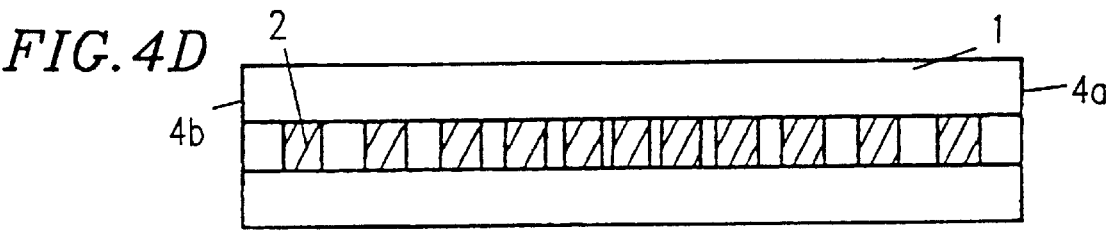
Figure 4E:
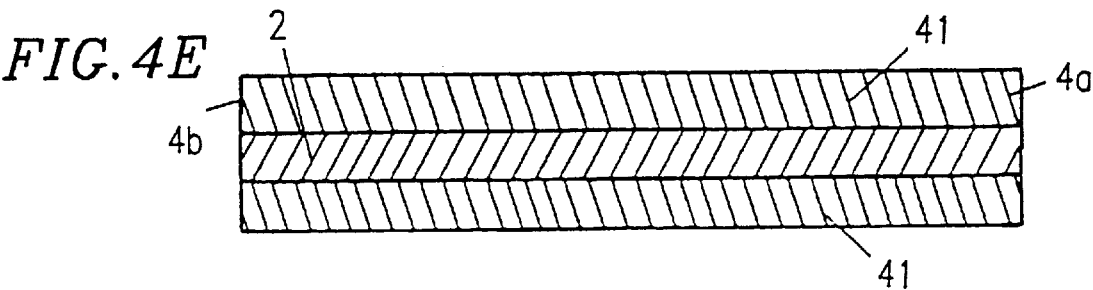
Figure 4F:
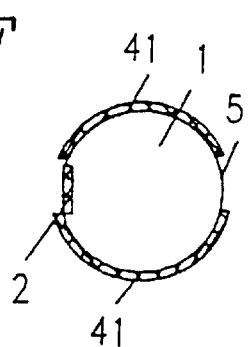
FIG. 4F is a cross-sectional view of FIG. 4E.
Figure 5:
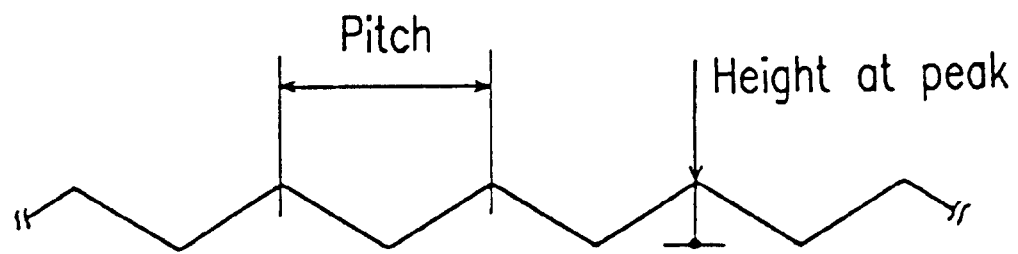
FIG. 5 shows the surface condition of the light diffusing section.
Figure 6:
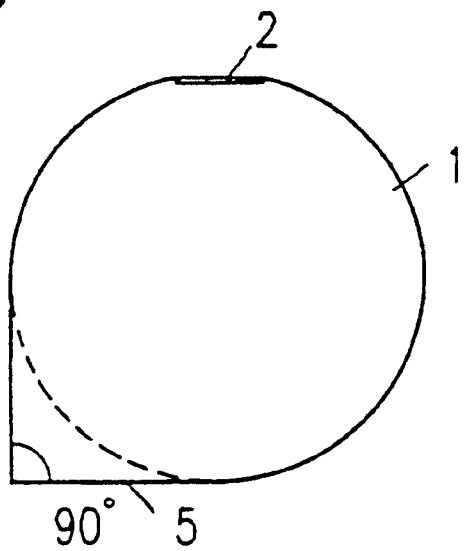
FIG. 6 shows the shape of an end cross-section of the guide.

FIGS. 1 through 6 show the configuration of a cylindrical linear illumination device according to Example 1 of the present invention. FIG. 1 is a perspective view showing a linear illumination device according to Example 1. The linear illumination device includes: a guide 1; a light diffusing section 2; and light emitters 3. As shown in FIG. 1, the guide 1 includes end faces 4a and 4b and a light emitting face 5. FIG. 2 shows a light emitting distribution (directionality) of the light emitters 3. FIG. 3 two-dimensionally shows the behavior of light beams entering the interior of the guide 1. FIG. 4A through 4E show examples of the shape of the light diffusing section 2 formed on the surface of the guide 1. FIG. 5 shows the surface condition of the light diffusing section 2 formed on the surface of the guide 1. FIG. 6 shows the shape of a cross-section of the guide 1. Throughout the above-mentioned drawings, the same components are denoted by the same reference numerals.

The operation of the linear illumination device having the above configuration will be described with reference to FIGS. 1 to 6. In Example 1, a cylindrical linear illumination device is shown as an example of a pillar shaped linear illumination device for convenience.

The guide 1 is made, by injection molding or extrusion, of a material having a light transmittance of 80% or higher (according to ASTM measurement method D1003) and a refractive index in the range of 1.4 to 1.7. As such a material, for example, a resin such as acrylic resin, polycarbonate resin, polystyrene resin or polyvinyl chloride or a light transmitting material such as glass can be used. The light diffusing section 2 is formed on part of a cylindrical side face of the guide 1. Since the surface of the guide 1 except the light diffusing section 2 should be smooth, if necessary, a process such as polishing is conducted for the surface of the guide 1 except the light diffusing section 2. Alternatively, the light diffusing section 2 can be fabricated by forming a groove on part of the side face of the guide 1 and then providing a light diffusing layer on the groove.

The light emitters 3, each of which includes a light emitting element such as light emitting diodes, are attached to and in contact with the end faces 4a and 4b. The light emitters 3 have a light emitting angle distribution (directionality), for example, in the range of 30 to 150 degrees as shown in FIG. 2. When the light emitters 3 are lit, light beams emitted from the light emitters 3 pass through the end faces 4a and 4b so as to enter the interior of the guide 1. Inside the guide 1, the light beams behave as shown in FIG. 3, in accordance with the Snell's law expressed by the following Formula 1.

$$\frac{\sin i}{\sin n} = \frac{n_r}{n_i} \qquad \text{[Formula 1]}$$

i: Angle between light beams 31 travelling into air from the interior of the guide and the normal of the surface of the guide r: Refractive angle when the light beams 31 are emitted into air $n_r$: Refractive index of air (i.e., 1)

$n_i$: Refractive index of guide (1.4 to 1.7)

More particularly, light beams, which are incident on the side face of the guide 1 at angles smaller than a critical angle ($i_o = \sin^{-1} (1/n_r)$), are refracted by the side face of the guide 1 so as to pass into air, as shown as 31 in FIG. 3. On the other hand, light beams which are incident on the side face of the guide 1 at angles equal to or larger than the critical angle are totally reflected by the side face of the guide 1. This is shown as 32 in FIG. 3 as light beams travelling through the interior of the guide 1 while being repeatedly totally reflected by the side surface thereof. When part of the light beams 32 are incident on the light diffusing section 2, that part of the light beams 32 is diffused instead of totally reflected.

The diffused light beams also behave in accordance with the Snell's law at the surface of the guide 1 which is a next destination of the light beams. Part of the diffused light beams, the incident angle of which with respect to the side face of the guide 1 is smaller than the critical angle, goes out into air so as to serve as illumination light beams 34. On the other hand, the remaining part of the light beams, the incident angle of which with respect to the side face of the guide 1 is equal to or larger than the critical angle, are totally reflected as shown as 33 in FIG. 3. The same phenomenon as described above occurs in a longitudinal direction of the guide 1 depending on whether a next destination of the light beam is the light diffusing section 2 or the side face of the guide 1 excluding the light diffusing section 2. Moreover, the same phenomenon repeatedly occurs in the cross-sectional direction of the guide 1.

Although the cylindrical guide 1 as shown in FIG. 1 is described as an example, the guide 1 can have other shapes such as a polygonal pillar shape. Furthermore, although the light diffusing section 2 is formed on the surface of the side face of the guide 1 as one continuous part so as to have a constant width, a width or an area of the light diffusing section 2 can be varied as moving from both ends of the guide 1 toward the central portion thereof in order to obtain uniform illumination light beams.

FIGS. 4A through 4E show examples of other possible shapes of the light diffusing section 2. FIG. 4A shows the light diffusing section 2 having a gradually increasing width as moving from both end faces 4a and 4b toward the central portion, which is formed as one continuous part. FIG. 4B shows the light diffusing sections 2 having a constant width formed on the side face of the guide 1 at constant intervals. FIG. 4C shows the light diffusing sections 2 formed at constant intervals, which has a gradually increasing width as moving from both end faces 4a and 4b of the guide 1 toward the central portion. FIG. 4D shows the light diffusing sections 2 having a constant width formed at gradually decreasing intervals as moving from both end faces 4a and 4b of the guide 1 toward the central portion. FIG. 4E shows the light diffusing section 2 formed on the side face of the guide 1 in the case where a total reflection layer 41 is formed on the side face of the guide 1 except the light outgoing face 5 and the end faces 4a and 4b being in contact with the light emitters 3. As the total reflection layer 41, a thin film made of metal such as palladium, iron, chromium, aluminum, silver or nickel or alloy thereof is used. Alternatively, the total reflection layer 41 is formed by processing ink containing these alloy fragments or alloy particles by vapor-deposition, sputtering, transferring, plating, painting, printing or the like.

The surface of the light diffusing section 2 formed on the surface of the guide 1 may be roughene. In this case, it is preferred that the surface condition of the light diffusing section 2 is such that center line average roughness Ra is in the range of (100 to 0.013)a and the maximum height Rmax is in the range of (400 to 0.05)S in terms of surface roughness indicated in JIS standard B0601. Alternatively, the cross-section of the light diffusing section 2 may have a triangular wave shape (or a sawtooth surface) having a pitch in the range of 50 $\mu$m to 2000 $\mu$m and a height at the peak in the range of 20 $\mu$m to 800 $\mu$m, as shown in FIG. 5. In either case, a light utilization efficiency can be enhanced as compared with the case where the light diffusing section 2 is not roughened or formed to have a triangular wave or a sawtooth shape. By roughening the surface of the light diffusing section 2 or forming the light diffusing section 2 to have a triangular wave or sawtooth shape, an incident angle of the light beams which are previously totally reflected by opposing side face of the guide 1 can be changed from the previous incident angle. This prevents the light beams which are once totally reflected at the side face of the guide 1 from remaining in the guide 1 while being repeatedly reflected, and therefore improves the light utilization efficiency. Accordingly, the illumination efficiency can also be improved.

Alternatively, in the case where the guide 1 has a cylindrical shape as described in Example 1, two plane portions can be formed on the light outgoing face 5 of the guide 1 so that an angle formed by the two planes is 90 degree as shown in the cross-sectional view of FIG. 6.

As described above, according to Example 1, the linear illumination device includes the guide made of a light transmitting material and the light diffusing section formed on the side face of the guide. The light emitters are arranged to be in contact with both end faces of the guide so that light beams emitted by the light emitters enter the guide from both end faces. Then, the light beams travel through the interior of the guide while being totally reflected by the side face of the guide. On the surface of the guide is formed the light diffusing section for diffusing the light beams incident thereon to pass into air. The light diffusion section is arranged along a longitudinal direction of the guide i.e., the main scanning direction. As a result, the guide emits light uniformly in the main scanning direction.

EXAMPLE 2

A linear illumination device according to Example 2 of the present invention will be described.

Figure 7:
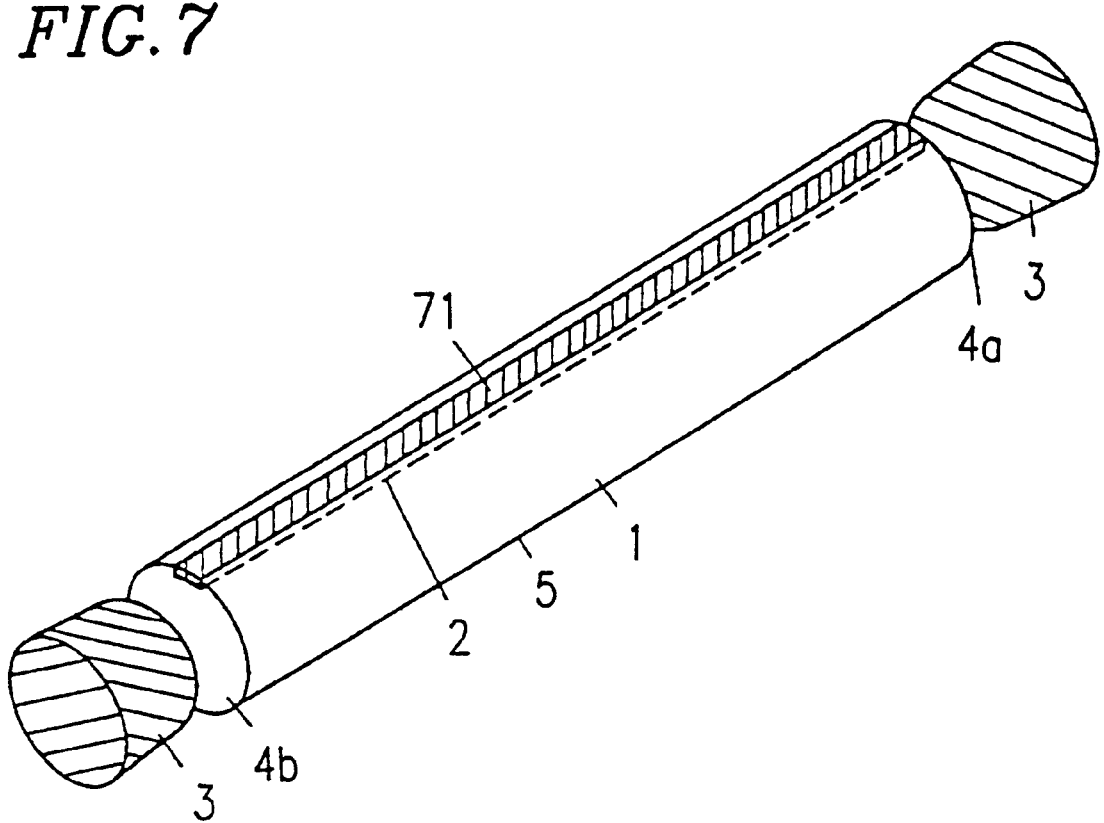
FIG. 7 is a perspective view showing a guide of a linear illumination device according to Example 2 of the present invention.

FIG. 7 is a perspective view showing a guide of a linear illumination device according to Example 2. In FIG. 7, components denoted by the same reference numerals as those in FIG. 1 refer to the same components. However, the linear illumination device shown in FIG. 7 differs from that shown in FIG. 1 in that a light diffusion layer 71 is provided instead of the light diffusing section 2.

The light diffusing layer 71 is formed of a light diffusing material having a larger refractive index than that of the guide 1 and a light transmitting resin having approximately the same refractive index as that of the guide 1, on the part of the surface of the guide 1 by printing, coating using a roll coater, painting or the like. For example, titanium oxide, zinc oxide, magnesium oxide, calcium carbonate or silica is used as the light diffusing material, and silicon resin is used as the light transmitting resin. Alternatively, the light diffusing layer 71 can be fabricated in the same manner as that of the light diffusing section 2 shown in FIGS. 4A through 4F.

Alternatively, the light diffusing layer 71 can be formed on the entire surface or part of the light diffusing section 2. In this case, light beams are more effectively diffused as compared with the case where the surface of the guide 1 on which the light diffusing layer 71 is formed (the interface between the light diffusing layer 71 and the guide 1) is smooth. Therefore, illumination efficiency of the linear illumination device is improved by 20% or more.

EXAMPLE 3

In Examples 1 and 2, a large part of light beams emitted from the light emitters 3 entering the interior of the guide 1 from one end face disadvantageously goes out from the opposite end face without being incident on the side face of the guide 1. Therefore, only part of the light beams emitted from the light emitters 3 serves as the illumination light beams 34. In other words, the light beams emitted from the light emitters 3 are not fully utilized, and therefore it is difficult to realize illumination in which the amount of illumination light is sufficient.

Hereinafter, a linear device which can provide a sufficient amount of light as illumination light will be described as a device according to Example 3 of the present invention.

Figure 8A:
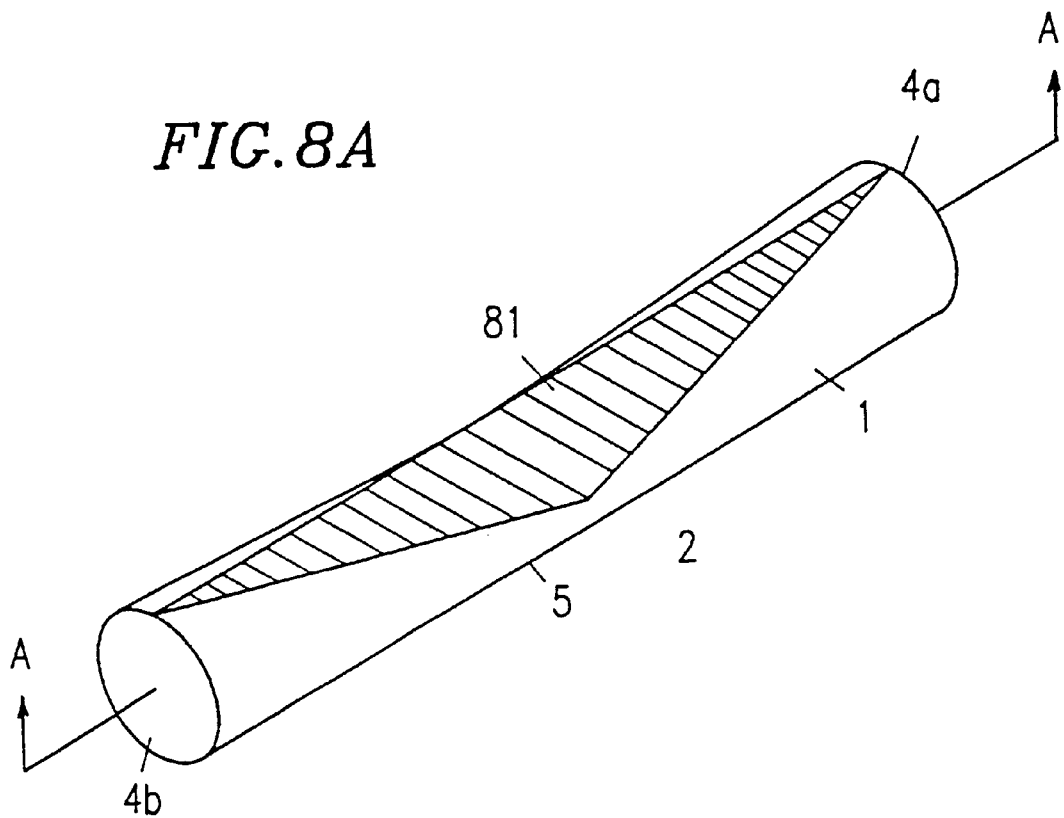
FIG. 8A is a perspective view showing a linear illumination device according to Example 3 of the present invention.
Figure 8B:
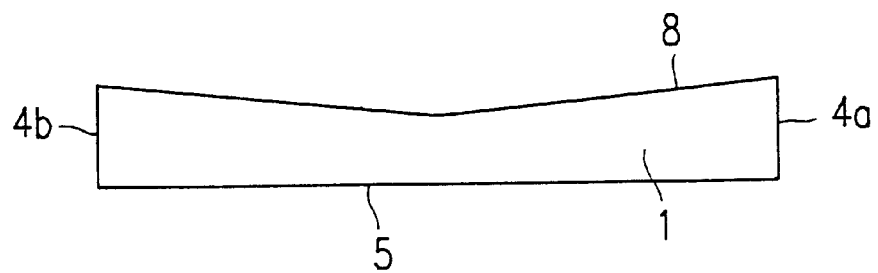
FIG. 8B is a cross-sectional view thereof.

FIGS. 8A and 8B are a perspective view and a cross-sectional view showing a linear illumination device according to Example 3 of the present invention, respectively. The linear illumination device in Example 3 differs from that in Example 1 in that the linear illumination device has a V-shaped cut face 81. In FIGS. 8A and 8B, the other same components as those in FIG. 1 are denoted by the same reference numerals as those in FIG. 1. Although the light emitters 3 are arranged to be in contact with the end faces 4a and 4b of the guide 1 as shown in FIG. 1, the light emitters 3 are omitted in FIGS. 8A and 8B for simplicity.

The V-shaped cut face 81 is formed by cutting the cylindrical side face of the guide 1 so that both a width and a depth of the cut face gradually increases as approaching the central portion of the guide 1 from the end faces 4a and 4b and becomes maximum in the central portion.

The operation of the linear illumination device having the above configuration will be described below.

When the light emitters 3 are lit, light beams emitted by the light emitters 3 enter the interior of the guide 1 from the end faces 4a and 4b. Then, the light beams, which are incident on the side face of the guide 1, behave in the same manner as that of the linear illumination device described in Example 1 so as to serve as illumination light beams 34. A large part of the light beams which are not incident on the side face of the guide 1 is incident on the V-shaped cut face 81 formed on the side face of the guide 1. On the entire surface or part of the surface of the V-shaped cut face 81 is formed the light diffusing section 2. Therefore, the light beams incident on the V-shaped cut face 81 are also diffused so that part of them go out of the guide 1 as the illumination light beams 34. In this way, in Example 3, the light beams emitted by the light emitters 3 can be used for illumination more effectively than in Examples 1 and 2.

In Example 3, the light diffusing section 2 is formed on the entire side face of the V-shaped cut face 81 as one continuous part. In order to obtain illumination light beams whose amount is uniform in main scanning direction, a width or an area of the light diffusing section 2 formed on the side face of the V-shaped cut face 81 can be varied as approaching the central portion between both end faces 4a and 4b of the guide 1.

Figure 9A:
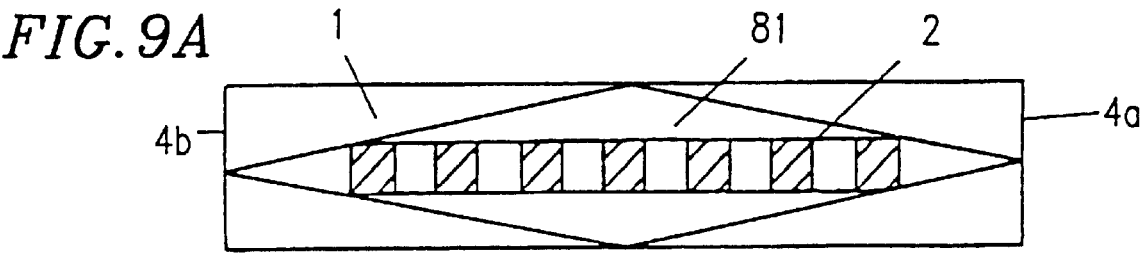
FIGS. 9A to 9D are plan views respectively showing examples of the shape of the light diffusing section according to Example 3.
Figure 9B:
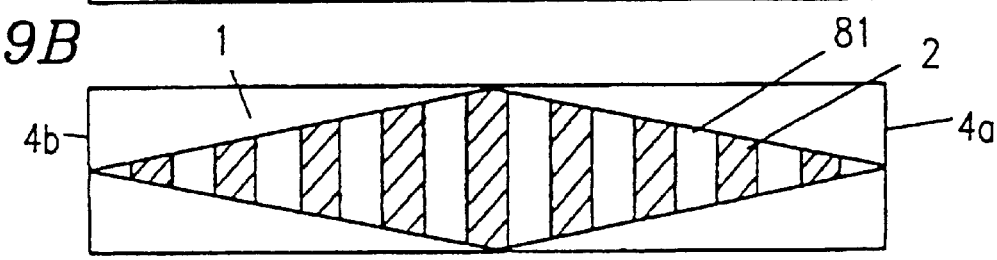
Figure 9C:
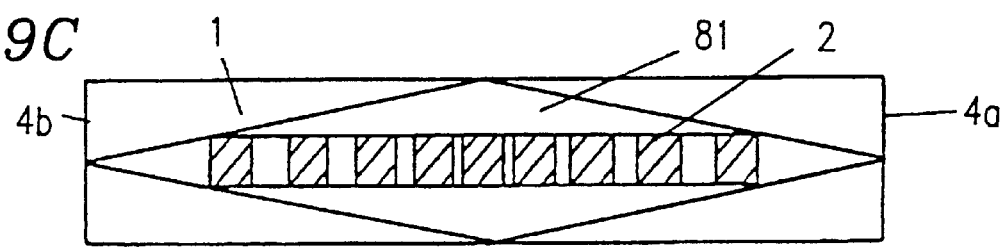
Figure 9D:
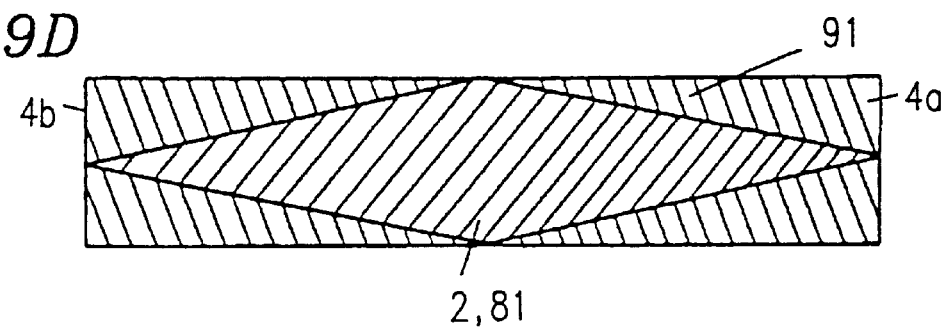
Figure 9E:
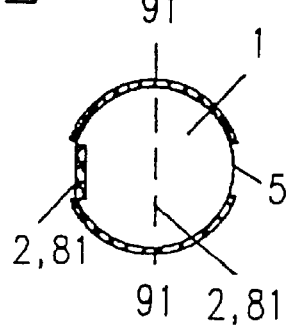
FIG. 9E is a cross-sectional view of FIG. 9D.

Other possible shapes of the light diffusing section 2 are shown in FIGS. 9A through 9D. FIG. 9A shows the light diffusing sections 2 having a constant width formed on the side face of the V-shaped cut face 81 at constant intervals. FIG. 9B shows the light diffusing sections 2 having a gradually increasing width as approaching the central portion between both end faces 4a and 4b of the guide 1, which is formed at constant intervals. FIG. 9C shows the light diffusing sections 2 having a constant width at gradually decreasing intervals as approaching the central portion from both end faces 4a and 4b. FIG. 9D shows the light diffusing section 2 in the case where a total reflection layer 91 is formed on the surface of the guide 1 except the light diffusing section 2, the light outgoing face 5 and the end faces 4a and 4b.

Furthermore, it is possible to replace the light diffusing section 2 shown in FIGS. 9A through 9D by the light diffusing layer 71, as in Example 2. Alternatively, the light diffusing layer 71 can be formed on the entire surface or part of the light diffusing section 2 formed on the entire side face or part of the V-shaped cut face 81.

As the total reflection layer 91, the thin film made of metal such as palladium, iron, chromium, aluminum, silver or nickel or alloy thereof is used. Alternatively, the total reflection layer 41 can be formed by processing ink containing these alloy fragments of alloy particles by vapor-deposition, sputtering, transferring, plating, painting, printing or the like.

It is preferred that the surface condition of the light diffusing section 2 formed on the side face of the V-shaped cut face 81 is such that center line average roughness Ra is in the range of (100 to 0.013)a and the maximum height Rmax is in the range of (400 to 0.05)S in terms of surface roughness indicated in JIS standard B0601. Alternatively, the cross-section of the light diffusing section 2 formed on the surface of the guide 1 can have a triangular wave shape (or a sawtooth surface) having a pitch in the range of 50 $\mu$m to 2000 $\mu$m and a height at the peak in the range of 20 $\mu$m to 800 $\mu$m. In either case, the illumination efficiency of the illumination device can be improved as described in Example 1.

As described above, the V-shaped cut face is formed by cutting the cylindrical side face of the guide so that a width and a depth of the cut face gradually increases as moving from the light incident faces of the guide toward the central portion and becomes maximum in the central portion. With such a configuration, not only light beams which are incident on the side face of the guide, but also a large part of the light beams, which are not incident on the side face of the guide, can be allowed to be diffused by the light diffusing section and/or layer. Therefore, the light beams travelling through the interior of the guide from one end face to the opposite end face without being reflected or diffused can be decreased, increasing the illumination efficiency of the illumination device.

EXAMPLE 4

Hereinafter, a linear illumination device according to Example 4 of the present invention will be described.

Figure 10A:
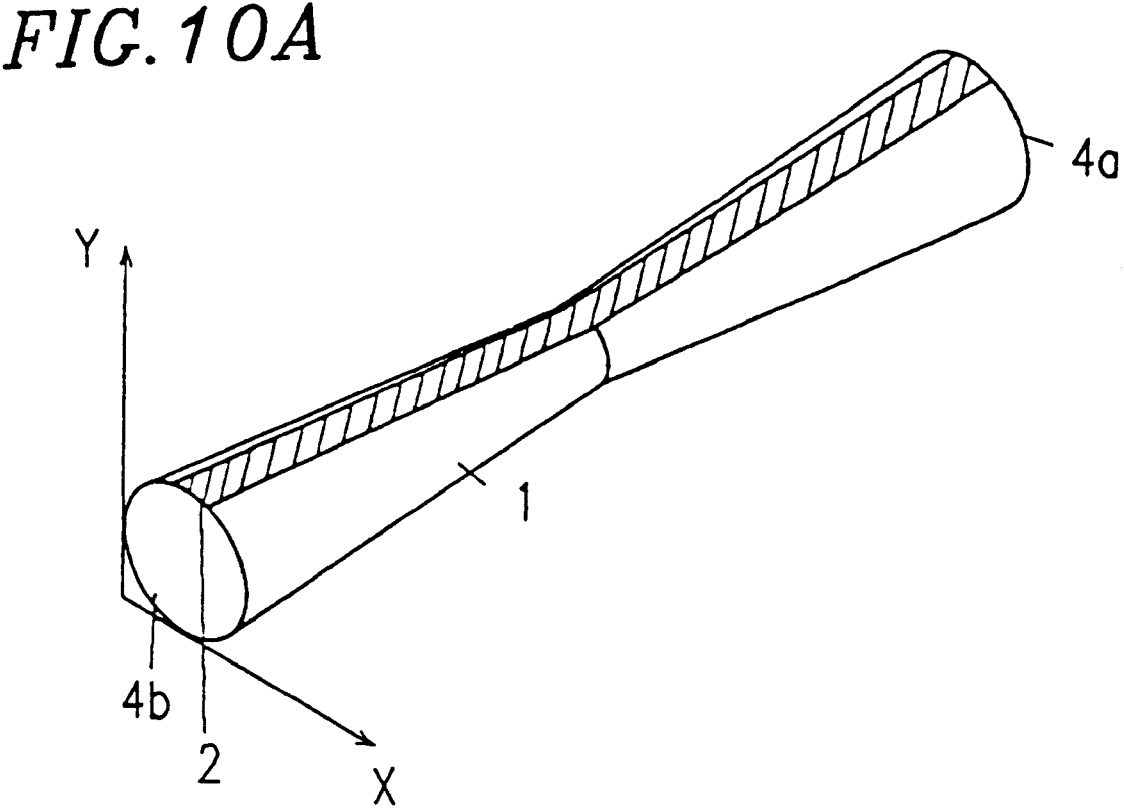
FIG. 10A is a perspective view showing a truncated cone shaped guide of a linear illumination device according to Example 4 of the present invention.
Figure 10B:
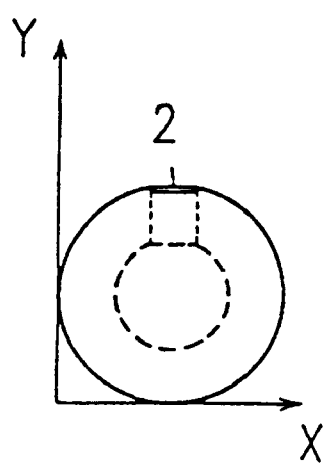
FIG. 10B is an end cross-sectional view thereof.
Figure 13:
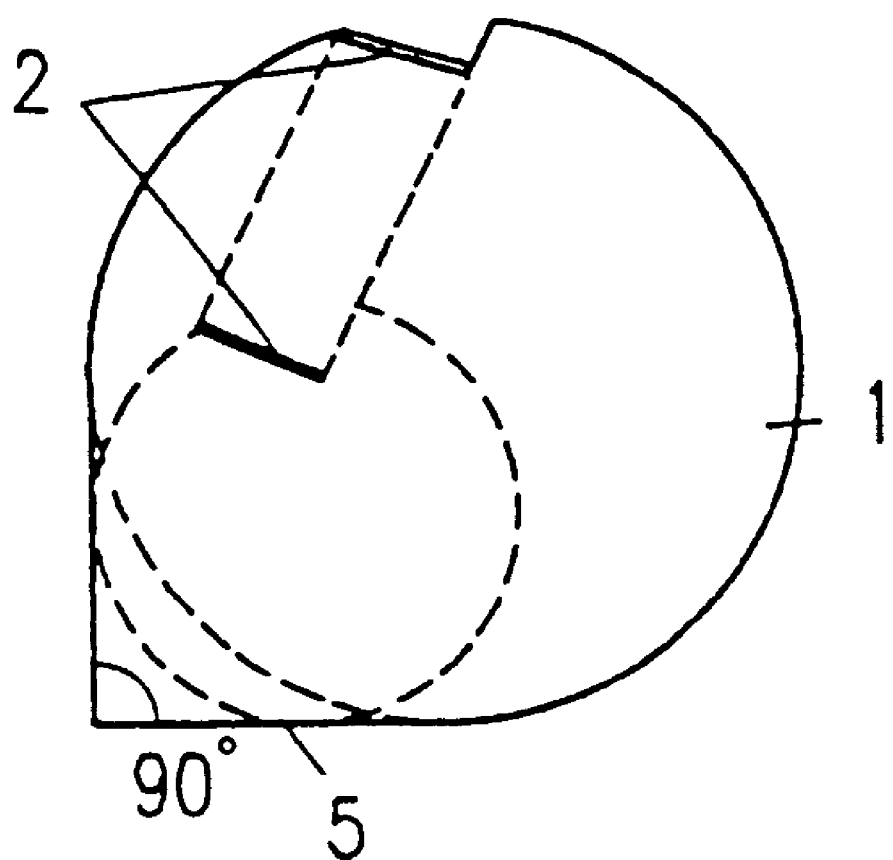
FIG. 13 shows a cross-section of the guide.

FIG. 10A is a perspective view showing a truncated cone shaped guide of a linear illumination device according to Example 4 of the present invention, and FIG. 10B is a cross-sectional view thereof. FIG. 11A through 11F show various shapes of a light diffusing layer formed on the side face of the guide. FIG. 13 shows a cross-section of the guide. Throughout FIGS. 10A and 10B, 11A through 11F and 13, the components as those shown in the aforementioned drawings are denoted by the same reference numerals. Although the light emitters 3 are arranged to be in contact with the end faces 4a and 4b of the guide 1, the light emitters 3 are omitted in FIGS. 10A and 10B for simplicity.

The guide in Example 4 differs from those in Examples 1 through 3 in that the guide has such a truncated cone shape that a cross-sectional area of the guide 1 gradually decreases as approaching the central portion from both ends 4a and 4b of the guide 1 and becomes minimum in the central portion with an area of 70% or less of the cross-sectional area of one of the end faces 4a and 4b. Such a truncated cone shape of the guide improves the uniformity in the main scanning direction as compared with the shapes in Examples 1 through 3.

Although the truncated cone shaped guide is described by way of example for convenience, the guide can have such a polygonal truncated cone shape that a cross-sectional area gradually decreases as approaching the central portion from both end faces of the guide and becomes minimum in the central portion while keeping the cross-sectional shape similar to that of the end face.

The operation of the guide of the linear illumination device having the above configuration will be described.

When the light emitters 3 are lit, light beams enter the interior of the guide 1 from both end faces 4a and 4b. The light beams are reflected and diffused in the same manner as in the linear illumination device described in Example 1. In addition, light beams travelling from one end face toward the opposite end face are gradually sharpened as moving toward the central portion. Therefore, the amount of illumination light beams 34 emitted from a portion in the vicinity of the central portion of the guide can be increased, thereby improving illumination efficiency and eliminating nonuniformity of illumination.

As described above, the guide 1 has such a truncated cone shape that a cross-sectional gradually decreases as approaching the central portion between both end faces and becomes minimum in the central portion. The guide 1 includes the light diffusing section 2 formed on the side face of the guide 1. With such shape and configuration, the amount of illumination light beams exiting the guide from a portion in the vicinity of the central portion can be increased. As a result, illumination efficiency can be improved while reducing the nonuniformity of illumination.

The light diffusing section 2 having a constant width is formed on part of the side face of the guide 1 as one continuous part in FIG. 10A. In order to obtain illumination light beams whose amount is uniform in the main scanning direction (in the longitudinal direction), however, a width or an area of the light diffusing section 2 can be varied from both end faces toward the central portion of the guide 1.

Figure 11A:
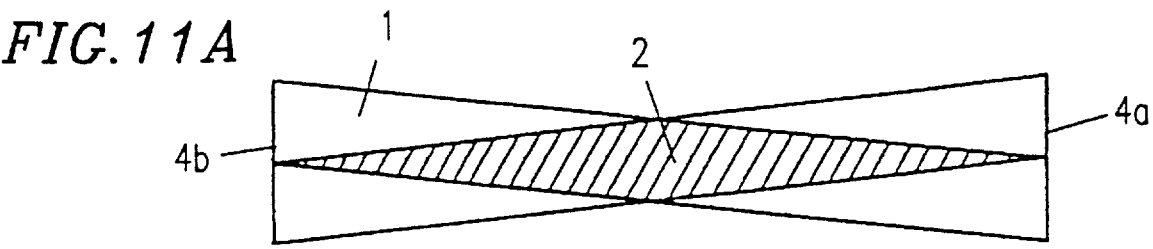
FIGS. 11A to 11F are plan views showing examples of the shape of a light diffusing layer according to Example 4 of the present invention.
Figure 11B:
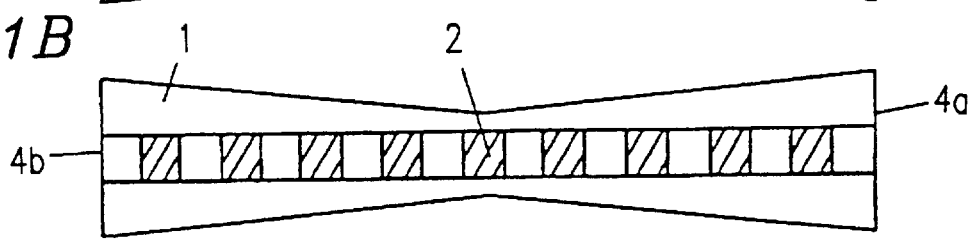
Figure 11C:
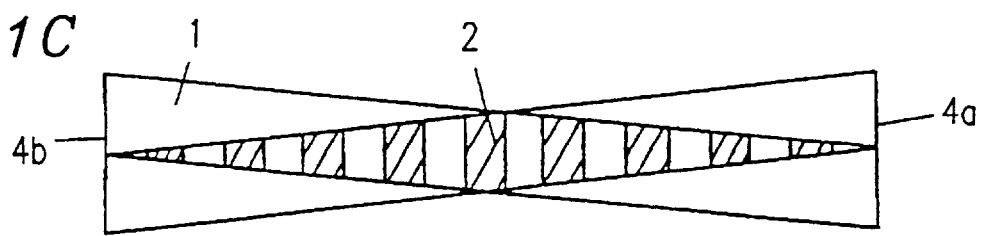
Figure 11D:
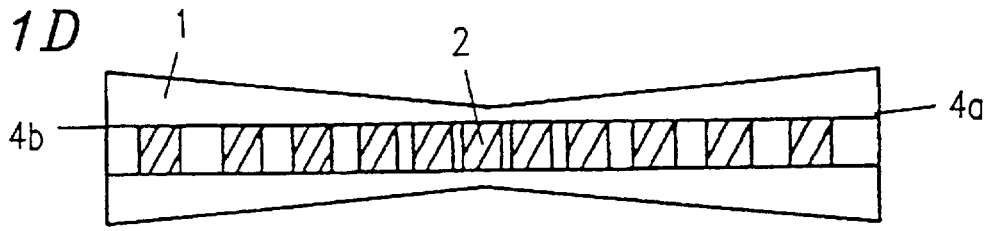
Figure 11E:
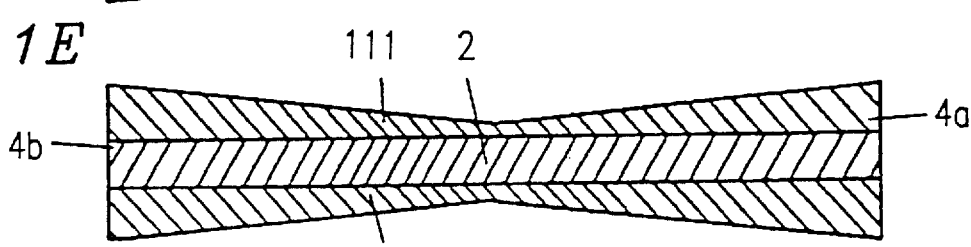
Figure 11F:
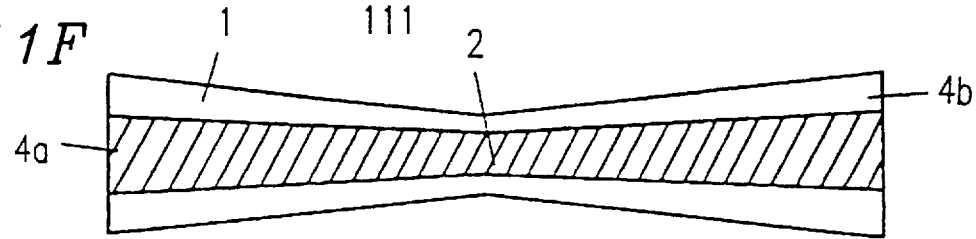

FIGS. 11A through 11B show other possible shapes of the light diffusing section 2. FIG. 11A shows the light diffusing section 2 having a gradually increasing width as approaching the central portion from both ends 4a and 4b of the guide 1, which is formed as one continuous part. FIG. 11B shows the light diffusing sections 2 having a constant width, which are formed at constant intervals. FIG. 11C shows the light diffusing sections 2 having a gradually increasing width as approaching the central portion between both ends 4a and 4b of the guide 1, which is formed at certain intervals. FIG. 11D shows the light diffusing sections 2 having a constant width, which are formed at gradually decreasing intervals as approaching the central portion from both end faces 4a and 4b of the guide 1. FIG. 11E shows the light diffusing section 2 in the case where a total reflection layer 111 is formed on the side face of the guide 1 except the light diffusing section 2, the light outgoing face 5 and the end faces 4a and 4b. FIG. 11F shows the light diffusing section 2 formed so that a ratio of a diameter of a cross-section of the guide 1 to a width of the light diffusing section 2 is kept constant along the longitudinal direction of the guide 1.

Moreover, it is possible to replace the light diffusing section 2 shown in FIGS. 10A and 10B by the light diffusing layer 71. Furthermore, the light diffusing layer 71 can be formed on the entire side face or part thereof of the light diffusing section 2 shown in FIGS. 10A and 10B. In the case of FIG. 11E, as the total reflection layer 111, a thin film made of metal such as palladium, iron, chromium, aluminum, silver or nickel or alloy thereof is used. Alternatively, the total reflection layer 111 can be formed by processing ink containing these alloy fragments or alloy particles by vapor-deposition, sputtering, transferring, plating, painting, printing or the like.

It is preferred that the surface condition of the light diffusing section 2 formed on the surface of the guide 1 is such that center line average roughness Ra is in the range of (100 to 0.013)a and the maximum height Rmax is in the range of (400 to 0.05)S in terms of surface roughness indicated in JIS standard B0601. Alternatively, the cross-section of the light diffusing section 2 formed on the surface of the guide 1 can have a triangular wave shape (or a sawtooth surface) having a pitch in the range of 50 $\mu$m to 2000 $\mu$m and a height at the peak in the range of 20 $\mu$ to 800 $\mu$m. In either case, the illumination efficiency of the illumination device can be increased as compared with the case where the light diffusing section 2 is not roughened or is not to be formed to have a triangular wave or a sawtooth shape, as described in Example 1.

Figure 12A:
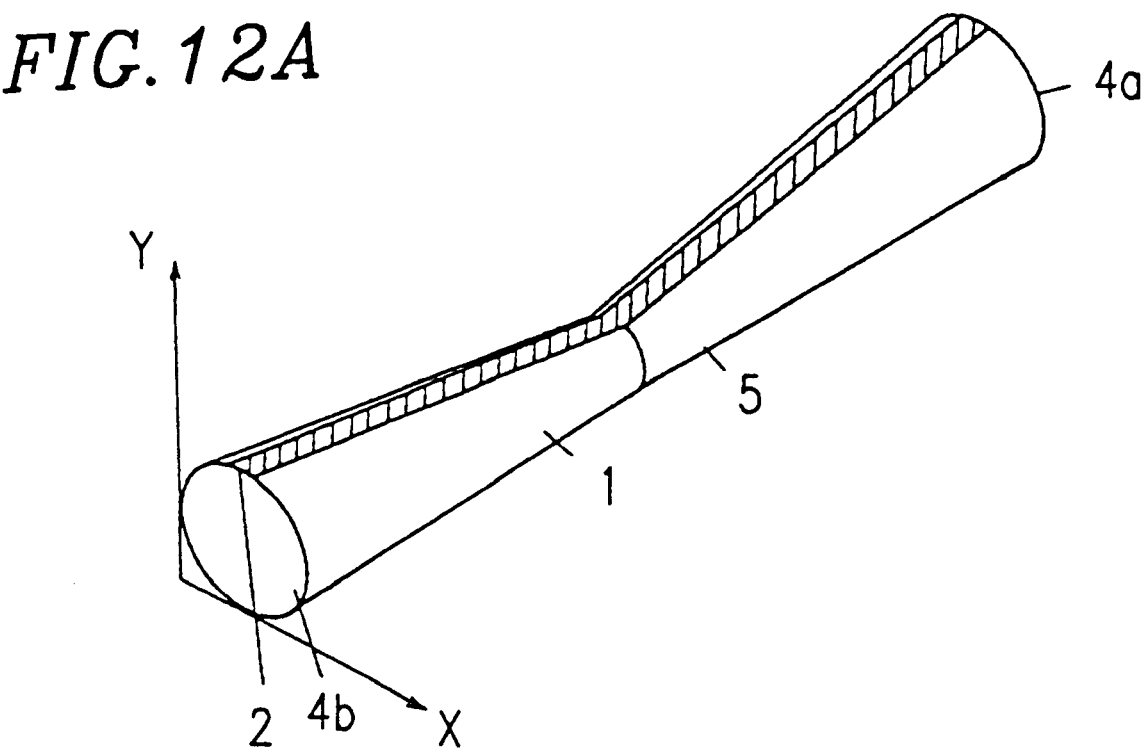
FIG. 12A a perspective view showing another truncated cone shaped guide according to Example 4 of the present invention.
Figure 12B:
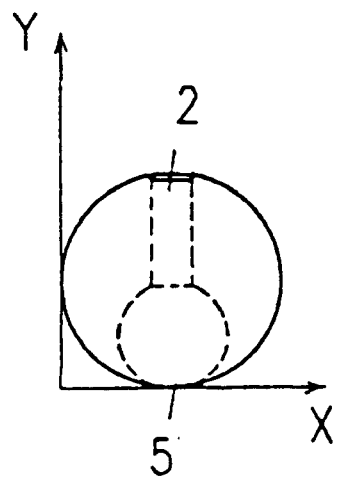
FIG. 12B is an end cross-sectional view thereof.

FIG. 12A is a perspective view showing another truncated cone shaped guide 1, and FIG. 12B is a cross-sectional view thereof. Instead the shape shown in FIG. 10A, the guide 1 can have a shape as shown in FIG. 12A. As shown in FIG. 12A, the guide 1 has such a truncated cone shape that a cross-sectional area in the longitudinal direction decreases between both end faces 4a and 4b of the guide 1 as approaching the central portion from both end faces 4a and 4b and becomes minimum in the central portion. Moreover, by connecting points on circumferences of cross-sections in the longitudinal direction of the guide 1, a straight line which extends substantially parallel to the axis of the guide 1 is obtained. The side face of the guide 1 containing the straight line is made to face the document. A portion in the vicinity of this straight line serves as a light outgoing surface 5. The entire surface or part of other side face serves as the light diffusing section 2. A cross-sectional shape of the guide 1 can be such a shape that two planes are formed on the light outgoing face 5 of the guide 1 so as to form an angle of 90 degrees therebetween as shown in FIG. 13, as long as the guide has a truncated cone shape as described in Example 4.

In order to fully utilizing the light beams which enter from one end face of the guide 1 and go out from the other end face without being reflected and diffused, it is desirable that the guide 1 is configured as a shape obtained by attaching two cones together at their summits so that the guide 1 has a straight line facing the document as the shape shown in FIG. 12A, instead of a truncated cone shape. However, in view of the strength of the guide 1, it is better that the central portion of the guide 1 is thick to a certain degree.

The comparative data between the linear illumination device shown in FIGS. 12A and 12B according to Example 4 and a conventional linear illumination device will be shown. In the linear illumination device shown in FIGS. 12A and 12B, a diameter of each of the end faces 4a and 4b is 5 mm, a diameter of a cross-section in the central portion is 2.7 mm, a width of the light diffusing layer 71 is 1 mm, and a depth of a groove is 0.5 mm.

TABLE 1

|  | Example 4 | Conventional |
|---|---|---|
| Illuminance on surface of document | 600 lux | 600 lux |
| Nonuniformity of illumination on surface of document | −7% | −15% |
| Distance between illumination system and surface of document | 1 mm | 9.5 mm |
| Number of LED chips | 8 | 24 |

As described above, a linear illumination device in Examples 1 through 4 includes light emitters on end faces of a guide made of a light transmitting material. The guide has a pillar shape or a truncated cone shape. Furthermore, a V-shaped cut face or a groove is formed on at least one surface of the guide. The V-shaped cut face or a groove is treated to be a roughened face or a triangular wave shape so as to form a light diffusing section. As a result, nonuniformity of illumination in the main scanning direction on the surface of the document to be illuminated is eliminated. Therefore, the illuminance can be increased without degrading uniformity of the illumination even when the linear illumination device approaches the surface of the document in close proximity thereof. Furthermore, since the linear illumination device can approach the surface of the document in close proximity thereof, the use of the linear illumination device according to Examples 1 through 4 is used for an illumination system of the optical image reading apparatus can contribute the reduction in size of the entire apparatus. Thus, it is possible to load the linear illumination device in machines required to be compact such as a portable facsimile machine. In addition, since the number of elements of the light emitters can be reduced, reduction in cost can be realized.

EXAMPLE 5

Figure 14:
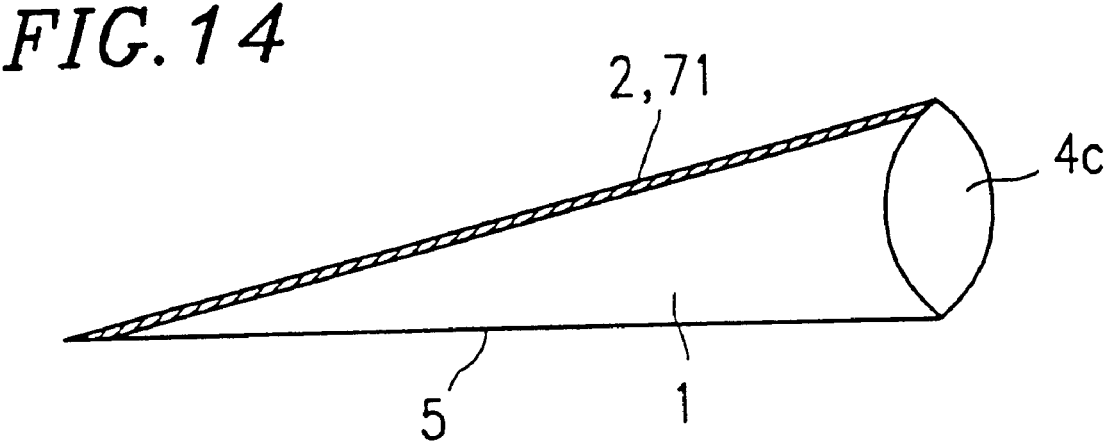
FIG. 14 is a perspective view showing a cone shaped guide according to Example 5 of the present invention.

With reference to FIG. 14, Example 5 of an illumination device of the present invention will be described. For simplicity, the light emitter 3 is omitted in FIG. 14.

Examples 1 through 4 above describe the case where light is made to enter the guide 1 provided so as to extend along the main scanning direction from both end faces thereof. On the other hand, in Example 5, light is made to enter the guide 1 from one end face. In order to make the light enter from one of the end faces so as to obtain uniform illumination light in the main scanning direction, it is contemplated that the guide 1 is formed as a cone shape as shown in FIG. 14. As in FIG. 14, in the case where the guide 1 has such a shape that a side face thereof contains a straight light parallel to the longitudinal direction of the guide 1 and light beams are emitted from the vicinity of the straight line, the light diffusing section 2 or the light diffusing layer 71 is provided in the position substantially facing the straight light. The light entering the guide 1 behave in the same manner as that described in Example 1 to go out from a portion 5 in the vicinity of the straight line.

In the case where light is made to enter from only one end face of the guide 1 extending in the main scanning direction, the shape of the guide 1 is not limited to that shown in FIG. 14. Alternatively, the guide 1 can have such a shape that the guide 1 as shown in Examples 1 through 4 above is cut in the central portion and a cut face is made to be a reflective face or a mirror face.

If the light is made to enter from one of the end faces of the guide 1 as described in Example 5, a ratio of a length of the part actually capable of emitting illumination light to a length of the entire illumination device in the longitudinal direction can be increased as compared with Examples 1 through 4. This is because the part which does not contribute to illumination in the illumination device can be reduced. Moreover, since only one light emitted is sufficient in the configuration of Example 5, the number of light emitters such as LED chips can be reduced.

Furthermore, the light entering from one end face of the guide 1 is sharpened as travelling toward the other face in the shape shown in FIG. 14. The light incident on the other end face is reflected in another shape. Thus, the light entering from one end face and going out from the other end face without being reflected and diffused can be eliminated. Therefore, in Example 5, the light utilization efficiency of light emitted from the light emitter can be further enhanced than that in Examples 1 through 4.

EXAMPLE 6

Figure 15B:
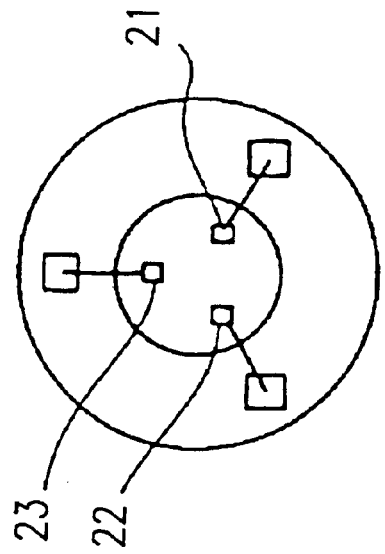
FIG. 15B is a side view thereof.
Figure 15A:
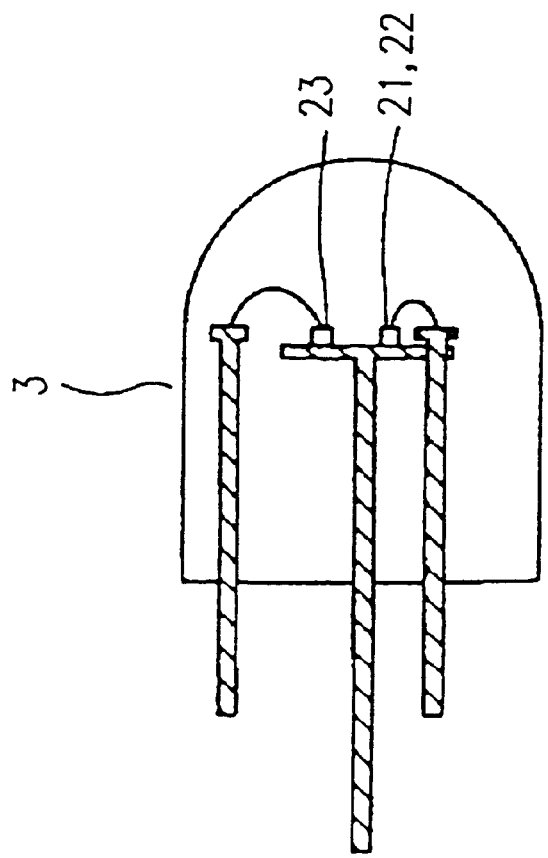
FIG. 15A shows a front view showing a light emitter included in a linear illumination device according to Example 6.

A linear illumination device according to Example 6 of the present invention will be described below with reference to FIGS. 15A to 15B. While the light emitting element emitting light in a certain wavelength band is provided in one of the light emitters 3 in Examples 1 through 5, light emitting elements 21, 22 and 23 respectively emitting light of R, G and B are provided in a single light emitter 3 as shown in FIGS. 15A and 15B in Example 6. Except this point, Example 6 is the same as Example 1. Therefore, the description of the configuration of the illumination device of Example 6 is emitted.

The light emitting elements 21, 22 and 23 are sequentially lit in a time divided manner, thereby emitting light beams of the respective colors in a time divided manner as the illumination light beams 34.

Instead of sequentially lighting the red light emitting element 21, the green light emitting element 22 and the blue light emitting element 23 included in each of the light emitters 3 in a time divided manner, the elements 21, 22 and 23 can be simultaneously lit. In this case, a color filter is provided in front of a light receiving portion (not shown) for receiving reflected light from the document so as to separate the light into respective colors.

Furthermore, instead of the light emitters 3 configured to include the red light emitting element 21, the green light emitting element 22 and the blue light emitting element 23 as shown in FIG. 2, a light emitter can be independently formed for each color. In such a case, as shown in FIG. 7; a red light emitter 71, a green light emitter 72 and a blue light emitter 73 can be brought in close contact with the guide 1 in a sequential manner by rotating a substrate 74 on which three light emitters 72, 73 and 74 are provided, thereby sequentially lighting the three light emitters. In this case, the red light emitter 71, the green light emitter 72 and the blue light emitter 73 can be LEDs respectively having their own color.

As in Example 1, according to Example 6, the light diffusing section 2 is provided for the side face of the guide 1 made of a light transmitting material. Then, the light emitters 3 are arranged to be in contact with the light incident surfaces (the end faces) 4a and 4b perpendicularly crossing the axis of the guide 1 so as to sequentially light emitting elements for three colors of the light emitters 3 in a time divided manner. Therefore, for each color, three always exist a group of numberless light beams which are reflected by the boundary between the interior of the guide 1 and air so as to travel through the interior of the guide 1 and another group of numberless light beams diffused by the light diffusing section 2 so as to pass into air. Consequently, light beams free from nonuniformity of illumination are radiated from the light outgoing face 5 of the guide 1 in a time divided manner. As a result, a color document placed on the optical color image reading apparatus is uniformly illuminated for each color.

Figure 16:
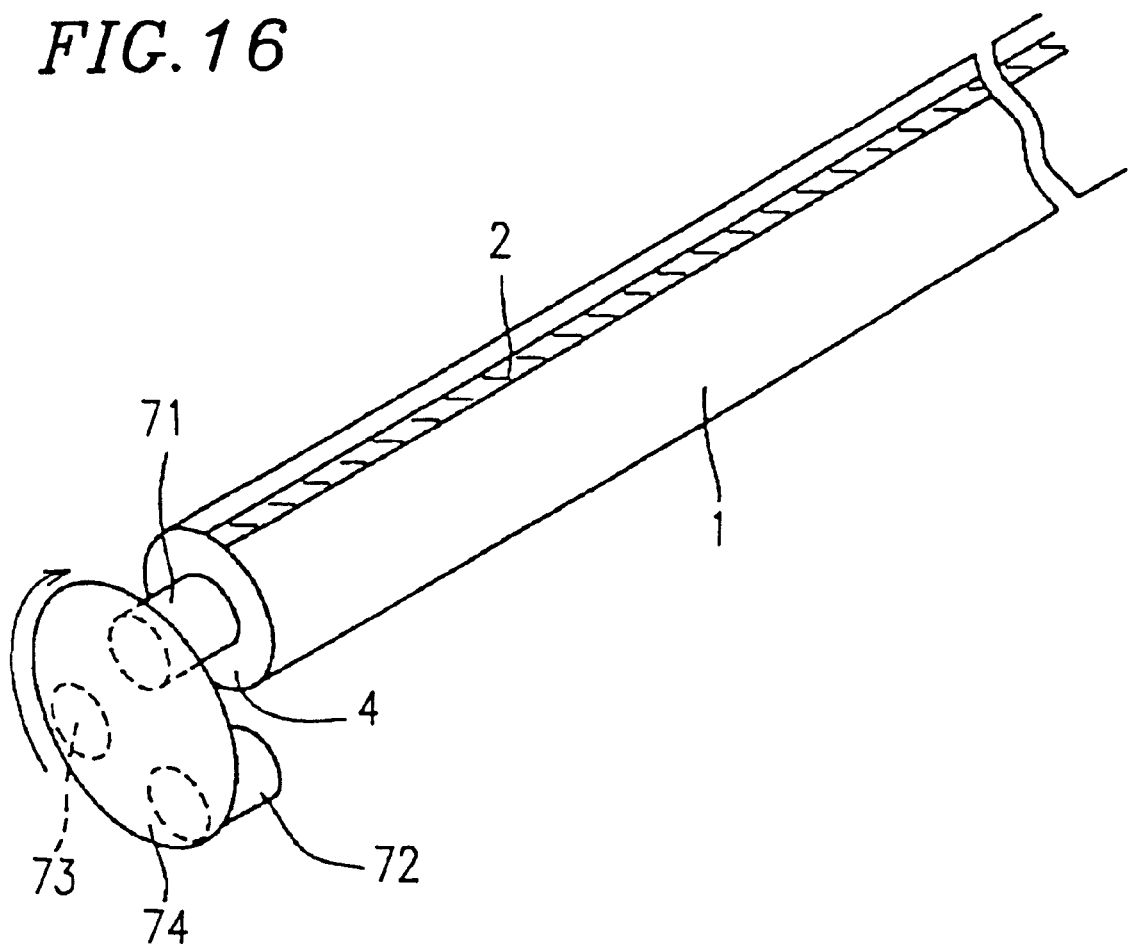
FIG. 16 is a perspective view showing another configuration of a light emitter in a linear illumination device according to Example 6 of the present invention.

Furthermore, by modifying Example 6, the light diffusing layer 81 can be provided as in Example 2. With this configuration, in the case where the three light emitting elements 21, 22 and 23 are provided in each light emitter 3 as shown in FIGS. 15A and 15B, and in the case where the light emitter is independently provided for each color as shown in FIG. 16, light having each color can be efficiently diffused. As a result, an illumination efficiency of the linear illumination device can be improved by 20% or more.

Figure 17:
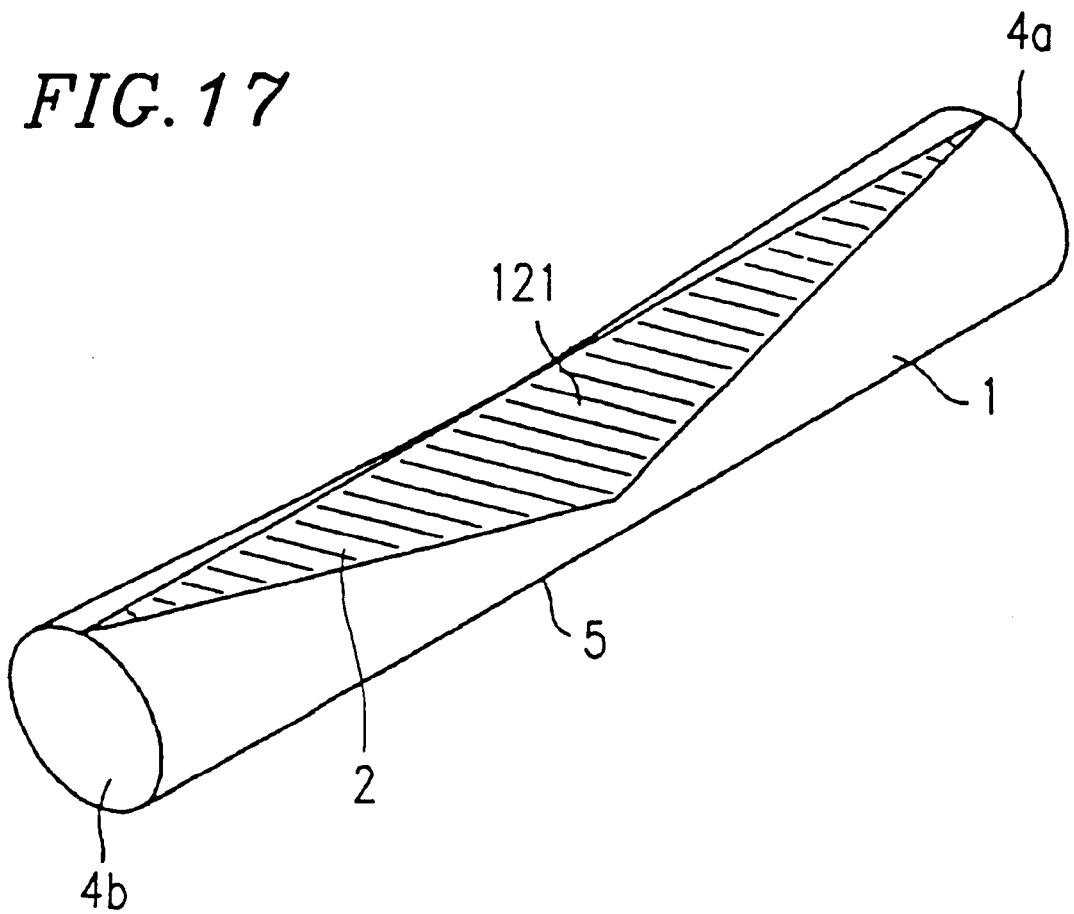
FIG. 17 is a perspective view showing still another configuration of a guide of a linear illumination device according to Example 6.
Figure 18A:
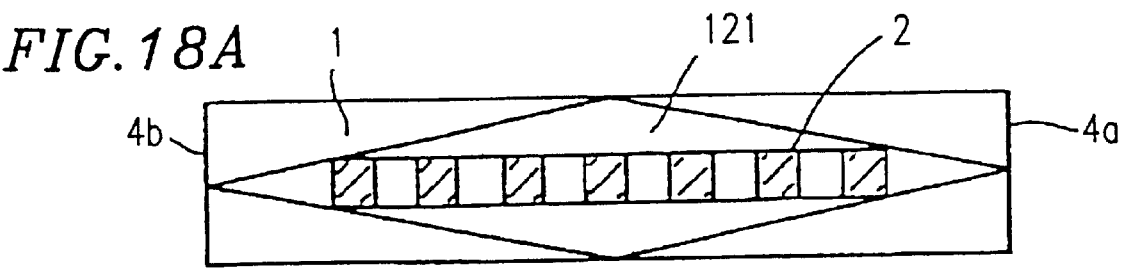
FIGS. 18A to 18D are plan views respectively showing examples of the shape of the light diffusing section according to Example 6.
Figure 18B:
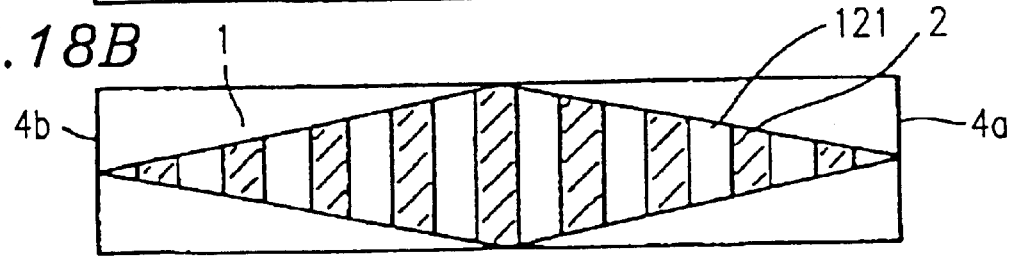
Figure 18C:
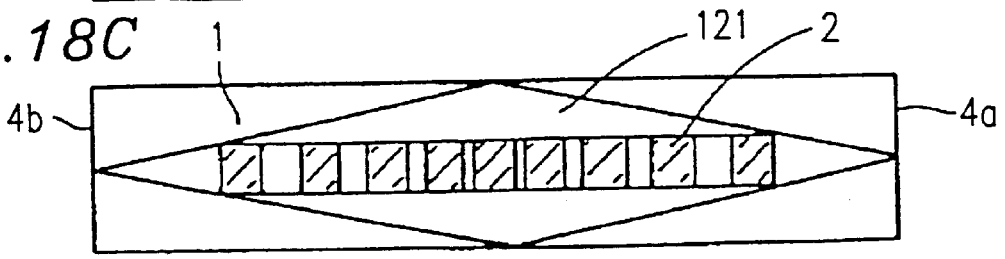
Figure 18D:
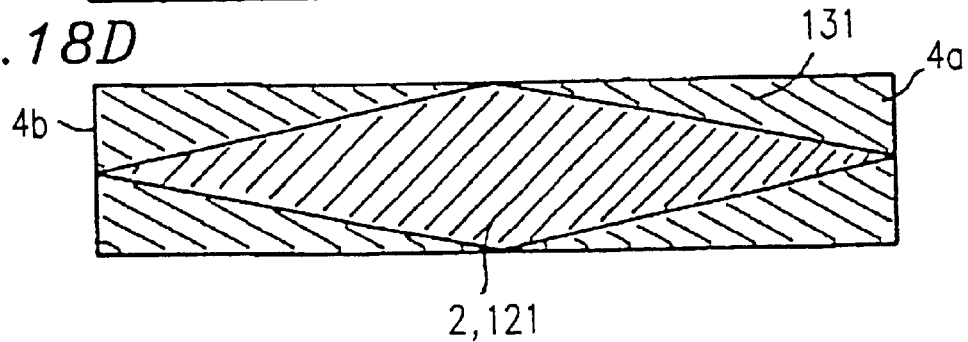
Figure 18E:
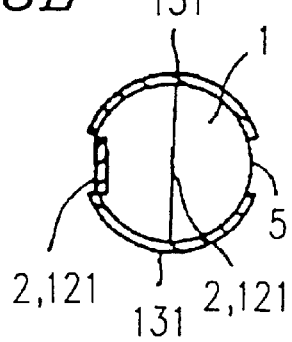
FIG. 18E is a side view of FIG. 18D.

Next, a further modification of an illumination device of the present Example 6 will be described. In this modification, as in Example 3, a V-shaped cut face 121 is formed on the side face of the guide 1 as shown in FIG. 17. The V-shaped cut face 121 is formed by cutting the cylindrical side face of the guide 1 so that both a width and a depth of the cut face gradually increases as approaching the central portion of the guide 1 between the end faces 4a and 4b and becomes maximum in the central portion. The light diffusing section 2 is formed over the entire surface of the V-shaped cut face 121. The part of the side face of the guide 1 facing the V-shaped cut face 121 serve as the light outgoing face 5. Alternatively, the light diffusing section 2 can be formed into pattern as shown in any one of FIGS. 18A to 18C on part of the V-shaped cut face 121. Alternatively, a total reflection layer 131 can be provided on the side face of the guide 1 except the V-shaped cut face 121 and the light outgoing face 5. Furthermore, in FIGS. 17 and 18A through 18D, the illumination device of this modification similarly functions even if the light diffusing section 2 is replaced by the light diffusing layer 71 as described in Example 2. If the light diffusing layer 71 is formed on the entire surface or part of the light diffusing section 2, an illumination efficiency can be further enhanced. As a material of the total reflection layer 131, any of the materials described in the above examples as materials of the total reflection layer can be used.

Also in this modification, if the surface of the light diffusing section 2 is roughened or formed into a triangular shape (a sawtooth surface) as mentioned above, an illumination efficiency can be further enhanced.

Furthermore, as described in Example 4, the guide 1 can have a shape obtained by attaching two truncated cones together at their end faces having smaller diameters. With such a shape, the amount of illumination light emitted from the light outgoing surface 5 in the vicinity of the guide 1 can be increased as compared with the guide 1 merely having a V-shaped cut face is used. The reason for this is as follows. Since a cross-sectional area of the guide 1 gradually decreases as moving from the end faces 4a and 4b toward the central portion, the light beams travelling from the end faces 4a and 4b toward the central portion is gradually sharpened. As a result, the uniformity of illumination can be further increased. Also in the case where the guide 1 has such a shape, the light diffusing section 2 and/or the light diffusing layer 71 can be similarly formed.

As described above, the linear illumination device of the present invention includes: the pillar shaped guide made of a light transmitting material; the light diffusing section formed on at least part of the side face of the guide; and the light emitter provided in the vicinity of both end faces approximately crossing the axis of the guide. The light emitted from the light emitter is allowed to enter the interior of the guide. Then, the light entering the guide 1 is repeatedly reflected until the light reaches the light diffusing section 2. When the light reaches the light diffusing section 2, the light is diffused by the light diffusing section 2 so as to go out from the face facing the light diffusing section 2 to the outside. The light diffusing section 2 is provided as one continuous part or is partially provided along the longitudinal direction of the guide 1. Therefore, the light going out from the guide 1 is uniform in the longitudinal direction of the guide 1, that is, in the main scanning direction.

The light emitter is constituted so that red (wavelength in the range of 600 nm to 700 nm), green (wavelength in the range of 500 nm to 600 nm) and blue (wavelength in the range of 400 nm to 500 nm) are sequentially illuminated in a time divided manner. The colored light emitted from the light emitters enters the interior of the guide from the end faces, and behaves in accordance with the Snell's law.

More specifically, the light beams, which are incident on the side face of the guide at angles smaller than the critical angle, pass through the side face of the guide so as to pass into air. On the other hand, the light beams, whose incident angles are out of the critical angle, do not pass through the side face of the guide while being repeatedly totally reflected at a boundary between the guide and air. If part of the light beams strikes on the light diffusing section, the part of the light beams is diffused instead of being totally reflected. The diffused light beams behave in accordance with the Snell's law at a boundary between the guide and air, which is a next destination of the diffused light beams. The diffused light beams which are incident on the next destination at angles smaller than the critical angle pass into air from the light outgoing face so as to contribute as illumination light beams. Since the similar phenomenon is repeated numberless time in all directions of cross-sections perpendicularly crossing the axis of the guide, illumination light beams going out from the light outgoing face becomes approximately uniform in the axial direction (the longitudinal direction) of the guide 1. The light beams having colors respectively corresponding to R, G and B are radiated in a time divided manner, colors of a color document can be separated on the illumination side.

The guide is constituted so that a shape of a cross-section perpendicularly crossing the axis of the guide is approximately circular or polygonal and an area of the cross-section is constant. As a result, a shape of the guide is simplified so as to facilitate the production thereof. Moreover, the approximately V-shaped cut face is formed by cutting the side face of the guide in an oblique and planar manner so that a width of the cut face gradually increases as moving from the light incident faces. Then, the light diffusing section is formed on the approximately V-shaped cut face. As a result, the amount of the light entering one end face and leaking outside from the other end can be reduced so as to improve the illumination efficiency. Alternatively, the guide can have such an approximately truncated cone shape or an approximately truncated polygonal pillar shape that a shape of a cross-section perpendicularly crossing the axis is approximately circular or polygonal and an area of a cross-section gradually decreases as moving from both end faces of the guide toward the central portion so as to be minimum. Also in this case, the amount of light beams entering the interior of the guide from one end face of the guide and leaking outside from the other end face can be reduced, thereby improving the illumination efficiency. Furthermore, by connecting a point on an outer circumference of each cross-section perpendicularly crossing the axis through a line parallel to the axis of the guide, the light outgoing face of the guide becomes approximately linear, thereby forming a linear region illuminated by the illumination light. By forming two planes in the vicinity of the light outgoing face of the guide so as to form approximately 90 degree therebetween, the light outgoing face of the guide becomes planar. As a result, a region illuminated by the illumination light can be planar.

Furthermore, by forming the light diffusing section having a constant width on the side face of the guide in the axis direction as one continuous part, or by forming the light diffusing sections in the axis direction at constant intervals, the formation of the light diffusing section is facilitated. Alternatively, by forming the light diffusing section so that a width increases as moving from both end faces of the guide toward the central portion, the amount of illumination light in the vicinity of the central portion of the guide 1 can be increased. As a result, the phenomenon that the amount of light generally decreases as moving away from the light emitter can be reduced. Alternatively, by forming the light diffusing sections on the side face of the guide in the axis direction at constant intervals so that a width increases as moving from both the faces of the guide toward the central portion, the amount of illumination light in the vicinity of the central portion of the guide 1 can be increased. Alternatively, the same effect can be obtained by forming the light diffusing section on the side face of the guide in the axis direction at constant intervals so that intervals decrease as moving from both end faces of the guide toward the central portion. Furthermore, by providing the total reflection layer in the region except the light diffusing section and the light outgoing faces, the light leaking outside from the region except the light diffusing section and the light outgoing faces can be eliminated so as to increase the amount of illumination light going out from the light outgoing face, thereby improving the illumination efficiency.

If the light diffusing layer is provided instead of the light diffusing section, approximately uniform illumination light can be similarly emitted from the light outgoing face of the guide. By providing the light diffusing layer on the entire light diffusing section or part thereof, the amount of light which is diffused and then is refracted to pass into air, is increased. As a result, the illumination efficiency is improved. The light diffusing layer is made of a mixture of the light diffuser having a refractive index larger than that of the guide and a light transmitting resin having a refractive index approximately equal to that of the guide. Therefore, since the light diffusing layer has the approximately same properties as those of the guide, heat resistance, weather resistance and the like can be improved. By constituting the light emitter by the light emitting diode, time required to emit light beams of R, G and B in a time divided manner can be shortened.

Since the linear illumination device of Example 6 and the modifications thereof has the effects as described above, nonuniformity of illumination in the main scanning direction can be reduced. Furthermore, according to Example 6 and the modifications thereof, illumination with three colors, i.e., R, G and B is made possible in one guide. Therefore, the optical color image reading apparatus which illuminates the document to be read by means of the illumination device can be reduced. Thus, it is possible to load the linear illumination device in a compact color facsimile machine or color copying machine, thereby contributing to the reduction of size of these machines. Furthermore, since the illumination system capable of emitting light beams of R, G and B in a time divided manner can be produced with a simple configuration, the cost can be lowered.

EXAMPLE 7

An image sensor of the present invention will be described.

Figure 19A:
FIG. 19A is a cross-sectional view showing an optical array plate of a direct contact type image sensor of the present invention.
Figure 19B:
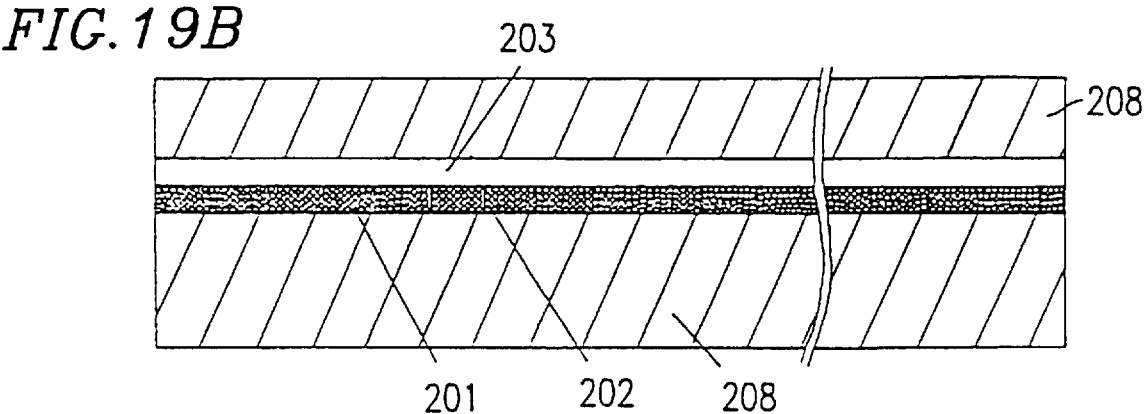
FIG. 19B is a plan view thereof.

FIG. 19A is a cross-sectional view showing an optical fiber array plate of a direct contact type image sensor of the present invention; and FIG. 19B is a plan view thereof. The optical fiber array plate includes: an optical fiber array 201 for directing light information from a document; a light absorbing layer 202 provided in the optical fiber array 201 at specific intervals; a transparent glass plate 203 provided in close contact with the side face of the optical fiber array 201; and a pair of opaque glass substrates 208 interposing the optical fiber array 201 and the transparent glass plate 203 therebetween.

Figure 20:
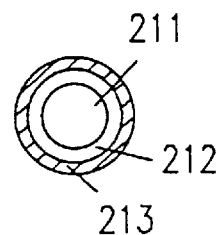
FIG. 20 is a cross-sectional view showing the configuration of an optical fiber constituting an optical fiber array.

FIG. 20 shows the configuration of an optical fiber constituting the optical fiber array. The optical fiber includes: a core 211; a cladding layer 212 formed on the outer surface of the core 211; and a light absorbing layer 213 formed on the outer surface of the cladding layer 212.

FIG. 21A is a schematic view showing a linear illumination device; and FIG. 21B is a cross-sectional view thereof. The linear illumination device includes a guide 222 having two end faces crossing the axis thereof and the light emitters 221 which are arranged to be in contact wit the tow end faces. In addition, a light diffusing layer 223 for diffusing light incident thereon is formed on the side face of the guide 1 so as to have a constant width as one continuous part in a longitudinal direction of the guide 1.

Figure 22A:
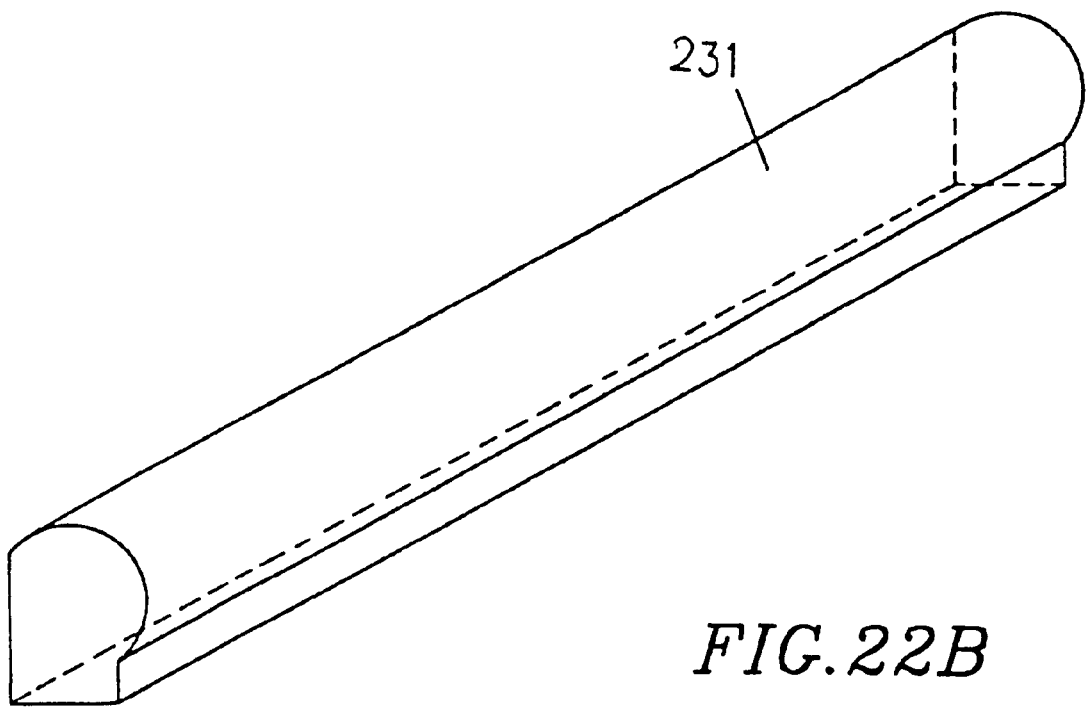
FIG. 22A is a schematic view showing a light rod of the linear illumination device according to Example 7.
Figure 22B:
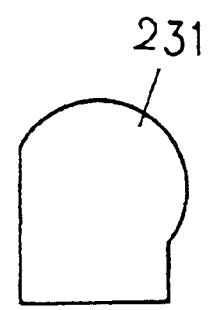
FIG. 22B is a cross-sectional view thereof.

FIG. 22A is a schematic view showing a light rod; and FIG. 22B is a cross-sectional view thereof. The light rod 231 serves to focus light emitted from a linear illumination device only in a sub-scanning direction to a certain degree and to direct the focused light to a transparent glass plate (slit) of the optical fiber array plate.

Figure 23:
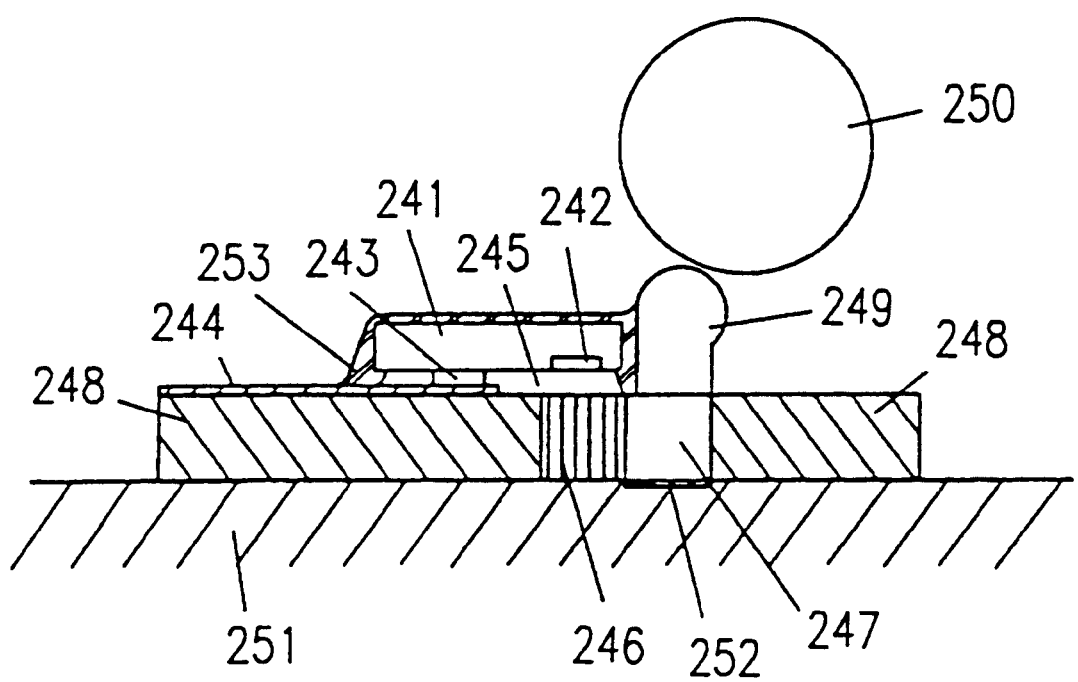
FIG. 23 is a front cross-section view showing a direct contact type image sensor unit according to Example 7 of the present invention.

FIG. 23 is a front cross-sectional view showing a direct contact type image sensor unit according to the present invention. The direct contact type image sensor unit includes: an image sensor chip 241; a light receiving array 242 formed on the surface of the image sensor chip 241; electrodes 243 formed on the surface of the image sensor chip 241; a circuit conductor layer 244 formed on one opaque glass substrate 248; an optical fiber array 246 placed so as to correspond to the light receiving element array 242; a transparent glass substrate 247 placed so as to be in close contact with the side face of the optical fiber array 246; a pair of opaque glass substrates interposing the optical fiber array 246 and the transparent glass plate 247 therebetween; a transparent photo-curable insulating resin 245 for mounting the image sensor chip 241 onto the opaque glass substrate 248 and the optical fiber array 246; the light rod 249 formed on the light receiving element array side of the transparent glass substrate 247; a linear illumination light source 250 placed in the vicinity of the light rod 249; a document 251 to be read; a light blocking layer 252 provided on the side of the transparent glass plate 247 in close contact with the document; an opaque sealing resin 253 for sealing the image sensor chip 241 and one side face of the light rod 249 (the side on which the image sensor chip 241 is placed) and blocking light therefrom.

Next, the fabrication process of the direct contact type image sensor unit having the above configuration will be described in detail.

First, the light receiving element arrays 242 such as phototransistors or photodiodes and access circuits (not shown) such as CCDs, MOSs or bipolar ICs are provided on a single-crystalline silicon substrate (wafer) by using a semiconductor process. Each of the electrodes 243 has such a configuration that an Au ire bump is formed on an Al electrode by wire bonding. Thereafter, the wafer is cut by using a high accuracy dicing technique, thereby producing the semiconductor image sensor chips 241.

Next, the optical fiber plate as shown in FIGS. 19A and 19B is fabricated in the following manner. The light absorbing layer 213 having a thickness in the range of 2 to 3 $\mu$m is formed on the outer surface of the cladding layer 212 of he optical fiber having a diameter of about 20 $\mu$m as shown in FIG. 20. Then, the optical fiber array 201 (shown as 246 in FIG. 23) is fabricated by arranging a multiple of the optical fibers in parallel in such a manner that the optical fiber array 201 viewed from above forms a band as shown in FIG. 19B. The transparent glass plate 203 (shown as 247 in FIG. 23) is attached to as to be in close contact with the side face of the optical fiber array 201. Next, the optical fiber array 201 and the transparent glass plate 203 are interposed between the pair of opaque glass substrates 248. Then, the opaque glass substrates 248 are heated at a temperature approximately equal to a glass melting point while being pressurized on both sides, thereby fabricating the optical fiber array plate.

Next, the circuit conductor layer 244 is formed of a noble metal such as Au, Ag-Pt by screen printing or by attaching a flexible print substrate onto one end face of the opaque glass substrate 248 of the optical fiber array plate as shown in FIG. 23. Furthermore, a black resin is applied onto the other end face (on the side in contact with the document) of the transparent glass plate 203 (shown as 247 in FIG. 23) by screen printing, thereby forming the light blocking layer 252. Next, the previously fabricated image sensor is mounted onto the glass substrate through the acrylate type transparent photocurable insulating resin 245 in a face-down bonding manner so that the light receiving array 242 is in close contact with the optical fiber array 201 (246) and the electrodes 243 are connected to the circuit conductor layer 244 at predetermined positions. In this way, the direct contact type image sensor is fabricated.

Regarding the linear illumination device 250, the guide 221 is made of acrylic or polycarbonate by injection molding to have a truncated cone shape as shown in FIGS. 21A and 21B. The guide 221 has such a truncated shape that a cross-section gradually decreases as approaching the central portion from end faces. On the side face of the guide 221, a groove extending along the longitudinal direction of the guide 221 and the light diffusing section 223 is formed on walls of the groove to have a shape shown in FIGS. 22A and 22B. Next, an LED element is molded with a transparent resin so as to fabricate the light emitter 222. The fabricated light emitter 222 is placed so as to be in contact with end faces of the guide 221.

The light rod 231 (shown as 249 in FIG. 23) is made of acrylic or polycarbonate by extrusion. The light rod 231 (249) is mounted onto the surface of the transparent glass plate 247 of the optical fiber array plate through a transparent resin having the same refractive index (n=1.5 to 1.6) as that of the light rod 231 (249) and the transparent glass plate 247 as to optically match the transparent glass plate 247.

The linear illumination device 250 is placed above the light rod 231 (249) in the close vicinity thereof as shown in FIG. 23, so that illumination light beams are incident onto the document at an angle in the range of 0° to 50°. In Example 7, the linear illumination device 250 is placed so that the illumination light beams are incident onto the document at about 40° (at about 25°, in a medium such as the guide, the light rod and the fiber array plate).

The operation of the thus fabricated direct contact type image sensor unit will be described below with reference to FIG. 23.

Light beams emitted from the linear illumination device 250 pass through the light rod 249 and are sharpened in the sub-scanning direction. In other words, a width of the light beams in a sub-scanning direction is reduced by passing through the rod 249. Thereafter, the light beams pass across the transparent glass plate 247 and the optical fiber array 246, and then illuminate the document 251. A light transmittance of the light absorbing layer 213 of the optical fibers constituting the optical fiber array 201 (246) is set to be about 20% so that a certain amount of light beams pass therethrough.

With the presence of the opaque glass substrate 248, the light blocking layer 231 and the opaque sealing resin 253, the light beams emitted from the linear illumination device 250 which are not reflected by the document 251 (i.e., flare light) are prevented from directly entering the light receiving element array 242.

Owing to the optical fiber array 201 (246), the light information from the document 251 is directed to the light receiving element array 242 on a one-by-one basis without causing light crossing (crosstalk).

As a result, with the use of the light receiving element array of 8 dots/mm, an MTF value of 65% is obtained at 41 p/mm. Moreover, nonuniformity of sensitivity is reduced to 15% from a conventional value, i.e., 25% (in the case where the LED array is used as an illumination device). As a result, the direct contact type image sensor unit capable of reading with high performance is realized. Furthermore, the distance between the linear illumination device 250 and the surface of the document is reduced to 1.5 mm from a conventional value of 10 mm. Consequently, since the entire size and weight of the sensor unit can be almost halved, the compact and light-weight sensor unit is realized. Furthermore, the number of LEDs required to illuminate an A4 sized document can be reduced to 4 to 8 while 24 to 32 LEDs are required in the LED array serving as a light source in the conventional sensor unit, resulting in reduction of cost.

As is understood from the above description, the illumination device 250 used in the direct contact type image sensor of the present invention has the same configuration as that shown in FIGS. 12A and 12B of Example 4. However, an illumination device used in the direct contact type image sensor of the present invention can be any one of those described in Examples 1 through 6.

According to the present invention, as described above, a remarkably compact and lightweight direct contact type image sensor unit capable of reading an image with high quality and high resolution and reducing nonuniformity of the sensor can be realized at low cost.

EXAMPLE 8

In any of the illumination devices described in Examples 1 through 6 above, the illumination light slightly expands in a sub-scanning direction due to the directionality of the LED chips. Therefore, there is a limit to enhance the illumination efficiency.

In Example 8, an illumination device having a high illumination efficiency without nonuniformity of illumination is described with reference to FIGS. 24A and 24B by reducing the expansion of the illumination light in the sub-scanning direction and increasing the expansion of the illumination light in the main scanning direction.

Figure 24A:
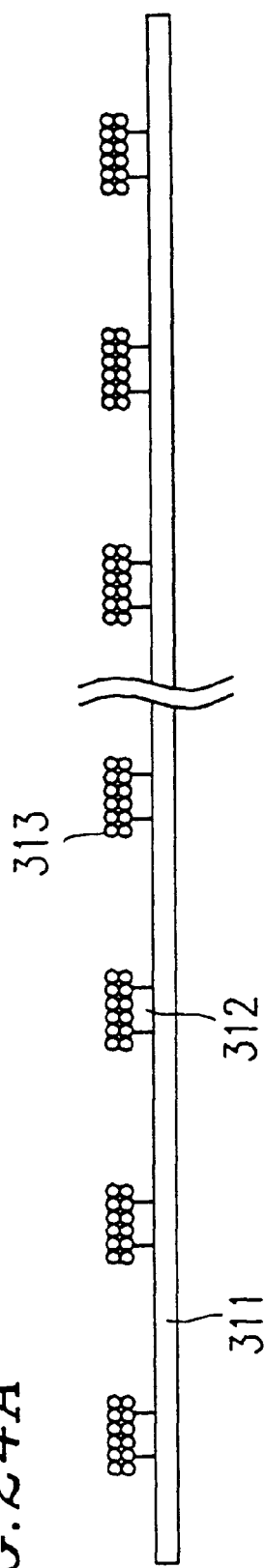
FIG. 24A is a cross-sectional view showing a linear illumination device according to Example 8.
Figure 24B:
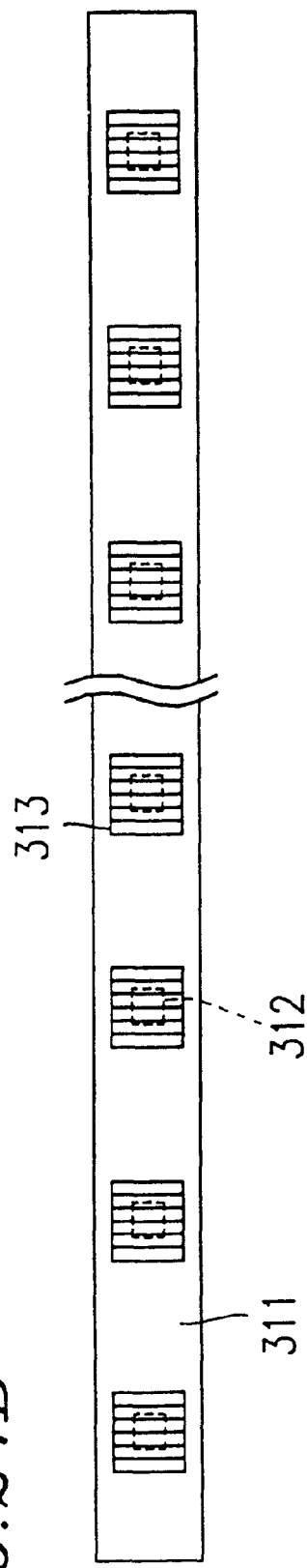
FIG. 24B is a plan view thereof.
Figure 28:
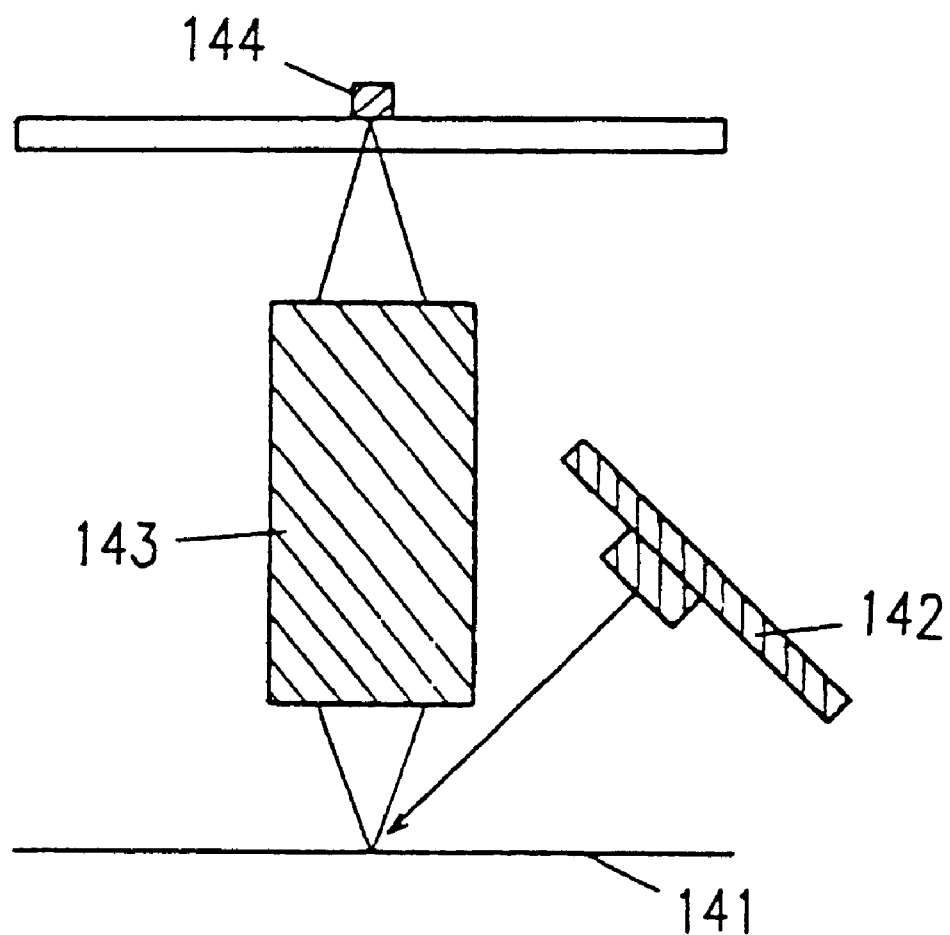
FIG. 28 shows the configuration of a conventional optical image reading apparatus.
Figure 29:
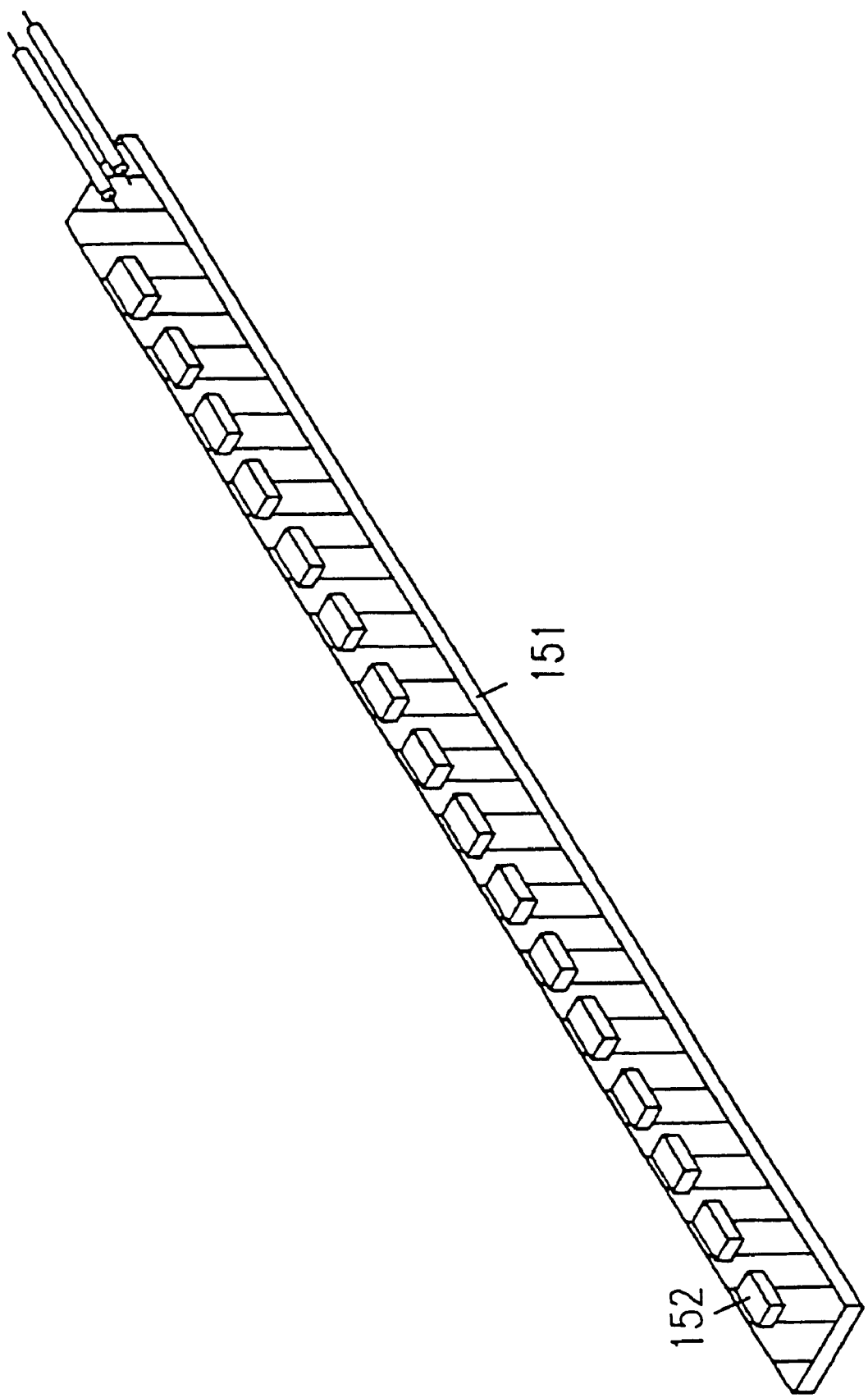
FIG. 29 shows the configuration of a conventional LED array serving as a linear illumination device.
Figure 30:
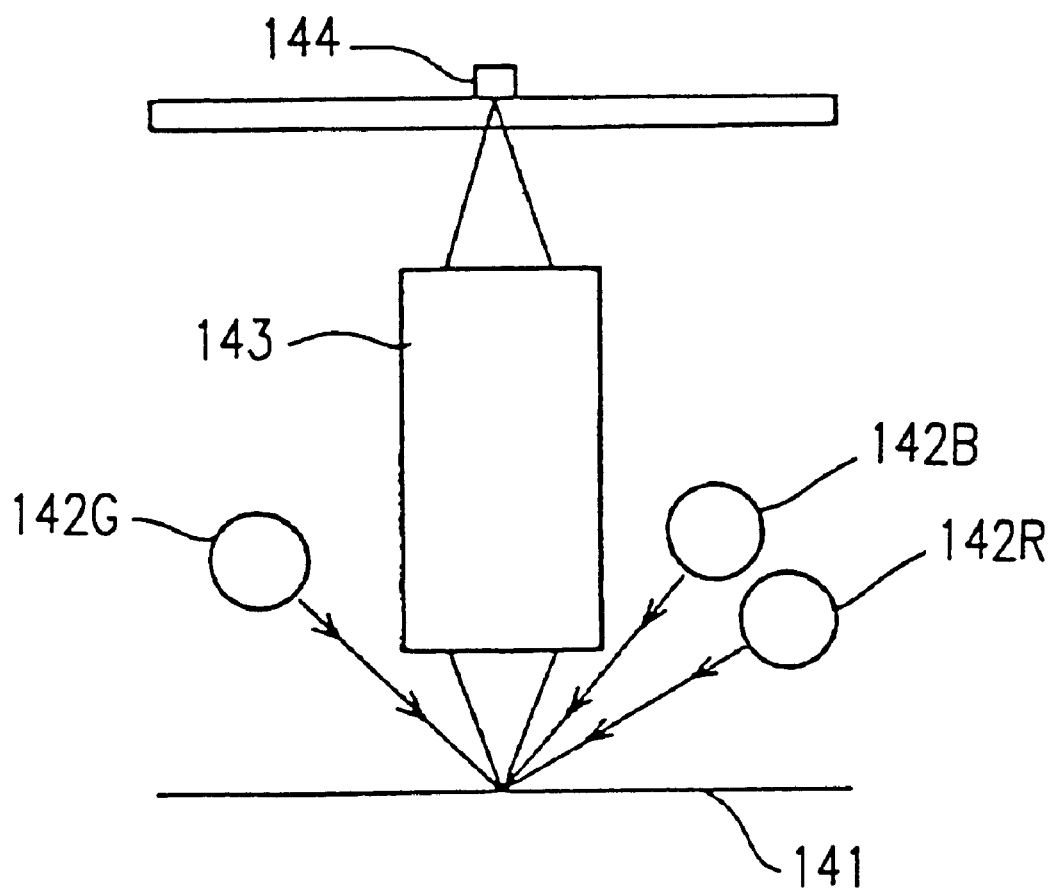
FIG. 30 is a side view showing the configuration of a conventional optical image reading apparatus.

FIG. 24A is a cross-sectional view showing a linear illumination device according to Example 8; and FIG. 24B is a plan view thereof. The linear illumination device includes: a circuit substrate 311; LED chips 312 mounted on the circuit substrate 311 in an array; and fiber array plates 313 attached onto the upper surfaces of the respective LED chips 312 so that the fiber plates are arranged in a longitudinal direction of the circuit substrate 312. The illumination device is incorporated to an optical image reading apparatus so that the longitudinal direction of the circuit substrate 312 in parallel to the main scanning direction.

The linear illumination device having the above configuration will be described in detail.

First, the LED chips 312 are mounted onto the circuit substrate 311 at constant intervals using a die mounter. As the LED chips 312, bare LED chips made of GaP, or, if high brightness is required, made of a quaternary system such as AlGaInP molded with a resin are used. In order to read a color image, LED chips of R (red), G (green) and B (blue) are alternately arranged in the longitudinal direction of the substrate 311 and mounted onto the circuit substrate 311. Next, the fiber array plates 313 are optically mounted onto the respective LED chips 312 using a highly transparent UV curable insulating resin so that the fiber plates are arranged in a longitudinal direction (main scanning direction) of the circuit substrate 311. After positionally aligning each of the fiber array plates 313 with each of the LED chips 312, the fiber array plates 313 are irradiated with UV rays so as to complete the optical mounting. The fiber array plates are fabricated by thermally pressing a unit of several hundreds of fibers. In this example, the fiber array plates 213 are made of an acrylate type material so that each fiber plate has a diameter of 50 $\mu$m.

The operation of the thus fabricated linear illumination device will be described below.

Illumination light beams going out from the LED chips 312 pass through the respective fiber array plates 233. Then, the illumination light beams which expand in a longitudinal direction (main scanning direction), reach the document without expanding in a latitudinal direction (sub-scanning direction) vertical to the longitudinal direction. Therefore, the document can be effectively illuminated with wide expansion in the main scanning direction. As a result, excellent illumination with reduced nonuniformity of illuminance on the surface of the document is realized. More specifically, it is confirmed by the inventors of the present invention that while the nonuniformity of illuminance is 15% when a conventional LED is used, the nonuniformity is reduced to 7% by using the illumination device of this example. Therefore, according to the present example, the document can be accurately read by the illumination device including a halved number of LED chips as compared with the conventional LED chips.

Moreover, it is possible to approximately halve the distance between the linear illumination device and the document as compared with the distance of the conventional illumination device, which in turn serves to reduce the size and weight of the optical image reading apparatus itself. Regarding the fiber array plate, satisfactory performance was obtained either with a fiber having a diameter of 75 $\mu$m or with a plate on which fibers are arranged only in a single line.

Moreover, it is apparent that the linear illumination device of Example 8 can also be used as a light source of an image sensor unit.

EXAMPLE 9

A linear illumination device according to Example 9 of the present invention will be described.

FIG. 25A is a cross-sectional view showing a linear illumination device according to Example 9 of the present invention; and FIG. 25B is a plan view thereof. The linear illumination device according to Example 9 includes: a circuit substrate 321; LED chips 322 mounted onto the circuit substrate 321 in an array; and reflective faces 323 provided in the regions on the circuit substrate 321 where the LED chips 322 are respectively mounted and the vicinity thereof.

FIGS. 26A through 26F show various shapes of one of the reflective faces 323 as examples.

The linear illumination device having the above configuration will be described in detail.

Concavities having a certain shape are formed on the surface of a substrate made of aluminum by pressing, thereby forming the reflective faces 323. A depth of the concavity is about two to three times the height, i.e., about in the range of about 0.6 mm to about 1 mm. The bottom face of the concavity on which the LED chip is to be mounted later is about 1.7 mm or so of the LED chip. The shape of the reflective face 323 can be determined in accordance with desired illuminance on the surface of the document and the distribution of the illuminance. It is assumed that longitudinal direction of the substrate which is parallel to the main scanning direction is an X direction; a latitudinal direction of the substrate which is parallel to the sub-scanning direction is a Y direction; and a direction perpendicular to these directions is a Z direction. A shape obtained by circularly or elliptically rotating a straight line, a parabola, a multidimensional curve or the like about a Z direction axis can be used as a shape of the reflective face 323, for example.

Next, an insulating resin is applied onto the surface of the aluminum substrate except the reflective faces 323, thereby fabricating the circuit substrate 321. Next, the bare LED chips 322 are mounted onto the respective reflective faces 323 on the circuit substrate 321 through die bonding using a die mounter and wire bounding, thereby completing the mounting. The LED chips 322 to be mounted are bare chips made of GaP, or, if high brightness is required, made of a quaternary system such as AlGaInP. A LED chip which can be used typically measures 0.3 mm by 0.3 mm by 0.3 mm.

In the case where the linear illumination device is used for reading a color image, the LED chips of R (red), G (green) and B (blue) are alternately arranged for each concavity. Alternatively, a set of three LED chips of R (red), G (green) and B (blue) can be arranged on each concavity of the reflective face 323.

The operation of the thus configured linear illumination device will be described below.

Among illumination light beams emitted from the LED chips 322, light components travelling ahead reach the document while the other light components travelling laterally and behind are reflected by the respective faces so as to travel ahead to reach the document. By varying the shape of the reflective face 323, the illumination efficiency and the nonuniformity of illuminance can be adjusted. For example, in the case where the reflective face 323 has an inverse truncated ellipsoidal cone shape, the illuminance on the surface of the document is improved to be about doubled as compared with a conventional LED array. Therefore, the number of LED chips required to realize the certain illuminance can be halved as compared with the number of LED chips which are previously required to realize the same illuminance. In Example 9, each LED chip is placed on the bottom face of the concavity in this way, light emitted from the LED chip in a backward direction and in a lateral direction is reflected to be directed toward the document. Thus, apart from the uniformity of illumination, the brightness and illumination efficiency can be increased.

Also in Example 9, the fiber array plate 313 as described in Example 8 can be provided on the upper surface of each of the light emitting elements 322. Owing to the fiber array plate 313, light emitted from the light emitting elements 322 expands in the main scanning direction without expanding in the sub-scanning direction. As a result, the uniformity of illumination light in the main scanning direction can be further improved. It is apparent that the linear illumination device of Example 9 can be also used as a light source of the image sensor unit described in Example 7.

EXAMPLE 10

A linear illuminance device according to Example 12 of the present invention will be described.

FIG. 27A is a cross-sectional view showing an illumination device according to Example 10 of the present invention; and FIG. 27B is a plan view thereof. The illumination device according to Example 10 includes: a circuit substrate 341; LED chips 342 mounted onto the 341 in a column; and a transparent plate 343 provided on the LED chips 342. The transparent plate 343 has a length in the longitudinal direction of the substrate 341 is approximately the same as that of the circuit substrate 341; a thickness corresponding to a width of the LE chip 342 in a latitudinal direction of the substrate 341; and a width corresponding to a distance from the LED chips 342 to the surface of the document to be illuminated.

The linear illumination device having the above configuration will be described in detail.

First, the LED chips 342 are mounted onto the circuit substrate 341 at constant intervals using a die mounter. As the LED chips 342, bare LED chips made of GaP, or, if high brightness is required, made of a quaternary system such as AlGaInP molded with a resin are used. In order to read a color image, LED chips 342 of R (red), G (green) and B (blue) are alternately arranged and mounted onto the circuit substrate 341. Next, the transparent plate 343 is optically mounted onto the respective LED chips 342 using a highly transparent UV curable insulating resin. After aligning the transparent plate 343 with the LED chips 342, the fiber array plates 343 are irradiated with UV rays so as to complete the optical mounting. Although either of glass or a transparent resin can be used as a material of the transparent plate 343, a highly light transmitting material is suitable for enhancing illumination efficiency.

The operation of the thus configured linear illumination device will be described below.

Illumination light beams emitted from the respective LED chips 342 pass through the transparent plate 343. Then, the illumination light beams are directed to the other end of the transparent plate 343 so as to illuminate a document placed in the vicinity thereof, without expanding in the latitudinal direction of the circuit substrate 341 (sub-scanning direction). Therefore, the surface of the document can be linearly illuminated with high efficiency (illuminance can be improved to be approximately doubled as compared with the conventional LED array). As a result, as compared with the conventional LED array, the number of LED chips required to obtain satisfactory illuminance can be halved.

According to Example 10, however, since a distance between LED chips is increased, there arises a need to separate the LED chips from the document. Therefore, although the configuration of Example 10 is effective to preserve the satisfactory illuminance, the configuration of Example 10 is not suitable for attaining the reduction of size of the optical image reading apparatus.

As described above, according to the present example, a linear illumination device having high illumination efficiency on a surface of a document and small nonuniformity of illuminance is realized. Therefore, a compact and lightweight optical image reading apparatus capable of reading an image with high quality and high resolution can be realized at low cost.

Furthermore, if concavities are formed on the substrate 341 and the LED chips are placed on the concavities, the light emitted from each LED chip can be effectively directed to the document. Therefore, it is possible to further increase an illumination efficiency so as to lead to reduction of the number of LED chips.

EXAMPLE 11

A linear illumination device according to Example 11 of the present invention will be described.

Figure 32A:
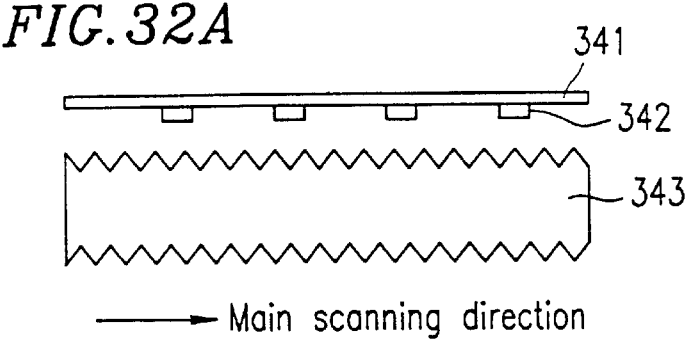
FIGS. 32A to 32E are cross-sectional views respectively showing linear illumination devices according to Example 11.
Figure 32B:
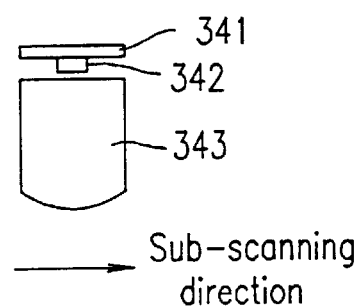
Figure 32C:
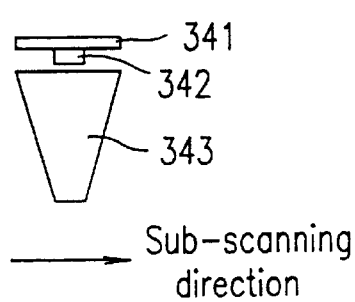
Figure 32D:
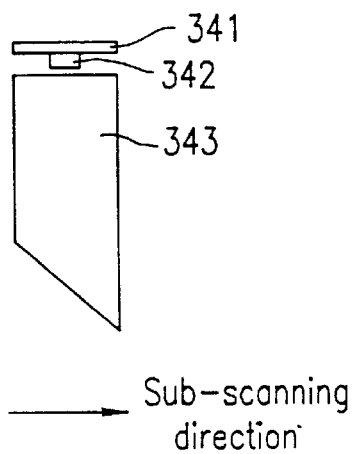
Figure 32E:
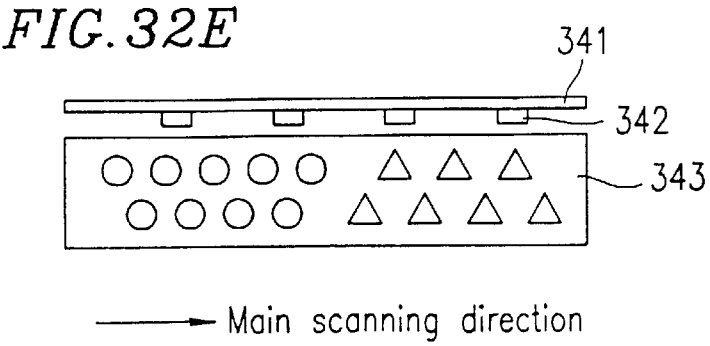

FIGS. 32A to 32E are cross-sectional views respectively showing linear illumination devices according to Example 11. FIGS. 32A and 32E show cross-sections taken along a main scanning direction, and FIGS. 32B, 32C and 32D show cross-sections taken along a sub-scanning direction. While both light incident face and light outgoing face of the transparent plate 343 are flat in Example 10, the light incident face is configured as a triangular wave face having a predetermined angle and a predetermined pitch in Example 11. By this shape, the uniformity of the illumination light in the main scanning direction can be further improved. Also in the case where the light outgoing face is configured as a triangular wave face instead of the light incident face, the uniformity of the illumination light in the main scanning direction can be similarly improved. As shown in FIG. 32A, if both light incident face and light outgoing face are configured as triangular wave faces, it is effective to improve the uniformity of the illumination light. In this case, a height at a peak of a triangular wave, an angle of a slope and a pitch of the light incident face and the light outgoing face can be either the same or different from each other. In any of the cases described above, a triangular wave face can be replaced by a face having a sawtooth cross-sectional shape.

As shown in FIG. 32B, the transparent plate 343 can have a barrel shape extending in the main scanning direction, and can be placed so that its curved face serves as the light outgoing face. The transparent plate 343 is provided with a lens function only in the sub-scanning direction by adopting such a shape, thereby further reducing a width in the sub-scanning direction of the light emitted from the transparent plate 343.

As shown in FIG. 32C, the transparent plate 343 is configured so that a width in the sub-scanning direction becomes narrower in the direction away from the light emitting element array 342. Alternatively, as shown in FIG. 32D, the transparent plate 343 is configured so that a width in the sub-scanning direction is kept constant to a certain distance from the light emitting element array 342 and then gradually decreases when exceeding the certain distance. In either case, since a width in the sub-scanning direction of the light entering the transparent plate 343 is gradually sharpened, illumination having a narrower width in the sub-scanning direction can be realized as compared with the illumination device including the transparent plate 343 having a constant width in the sub-scanning direction as in Example 10.

Furthermore, as shown in FIG. 32E, a refractive index of part in the transparent plate 343 can be varied by forming a plurality of cavities in the transparent plate 343. Each of the cavities can have, for example, a cylindrical shape or a triangular prism shape extending in the sub-scanning direction. In the case where the cavity has a triangular prism shape, the cavities are formed so that one side face is opposed to the light incident face of the transparent plate 343 and an edge (corresponding to one summit of a triangular cross-section) opposing the side face is closer to the light incident face than the side face. In this way, by providing the cavities having a pillar shape extending in the sub-scanning direction in the transparent plate 343, light is diffused in the transparent plate 343. Therefore, illumination light which is more uniform in the main scanning direction can be obtained.

Hereinafter, two modifications of Example 11 will be described with reference to FIGS. 33A through 34B. In these modifications, the transparent plate 343 in Example 11 is replaced with transparent plates 343a and 343b. Each of the transparent plates 343a and 343b has substantially the same lengths as the circuit substrate 341 both in the longitudinal direction (the main scanning direction) and in the latitudinal direction (the sub-scanning direction) of the circuit substrate 341. In the direction perpendicular to the main scanning direction and the sub-scanning direction, a total length obtained by adding the length of the transparent plate 343a to the length of the transparent plate 343b, is substantially equal to a distance between the array of LED chips 342 and the document to be illuminated by the linear illumination device.

Figure 33A:
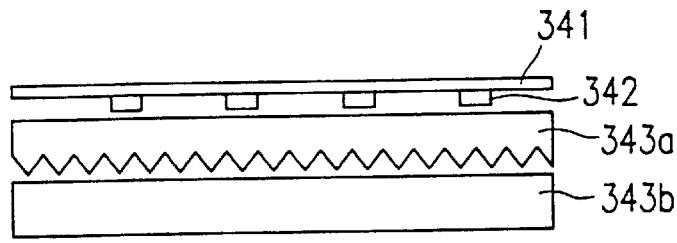
FIG. 33A is a cross-sectional view showing a modification of Example 11 of the present invention, taken along a main scanning direction.
Figure 33B:
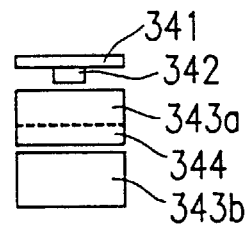
FIG. 33B is another cross-sectional view of the linear illumination device, taken along a sub-scanning direction.
Figure 34A:
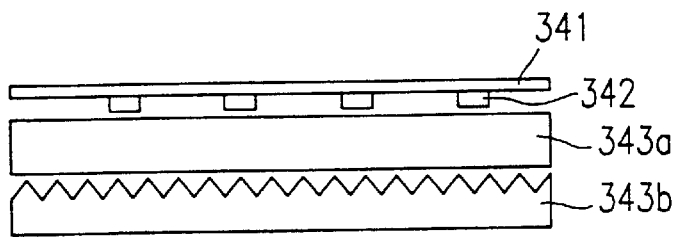
FIG. 34A is a cross-sectional view showing another modification according to Example 11 of the present invention, taken along a main scanning direction.
Figure 34B:
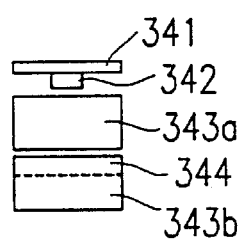
FIG. 34B is another cross-sectional view of the linear illumination device, taken along a sub-scanning direction.

In one modification, the light outgoing face of the transparent plate 343a, which is opposite to the face adjacent to the LED chips 342, is configured as a triangular wave face having a predetermined angle and a predetermined pitch as indicated with 344a in FIG. 33A. Due to this shape, the uniformity of the illumination light in the main scanning direction can be further improved, as described in Example 1 with reference to FIG. 5. In the other modification, the light incident face of the transparent plate 343b, which is adjacent to the transparent plate 343a, is configured as a triangular wave face having a predetermined angle and a predetermined pitch as shown by 344b in FIG. 34A. Therefore, the uniformity of the illumination light outgoing from the face opposite to the triangular wave face 344b can be also improved. Alternatively, both of the light outgoing face 344a of the transparent plate 343a and the light incident face 344b of the transparent plate 343b may be configured as triangular wave faces. In this case, a height at a peak of a triangular wave, an angle of a slope and a pitch of the light incident face and the light outgoing face can be either the same or different from each other. In any of he cases described above, a triangular wave face can be replaced by a face having a sawtooth cross-sectional shape.

Figure 35A:
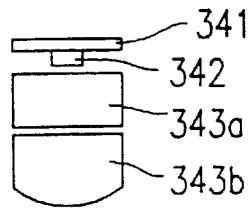
FIGS. 35A and 35B are cross-sectional views respectively showing modifications of Example 11.

As shown in FIG. 35A, the transparent plate 343b can have a barrel shape extending in the main scanning direction, and can be placed so that its curved face serves as the light outgoing face. The transparent plate 343b is provided with a lens function only in the sub-scanning direction by adopting such a shape, thereby further reducing a width in the sub-scanning direction of the light emitted from the transparent plate 343b.

Figure 35B:
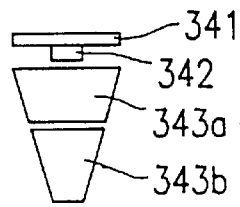

As shown in FIG. 35B, both of the transparent plates 343a and 343b are configured so that a width in the sub-scanning direction becomes narrower in the direction away from the light emitting element array 342. Alternatively, the transparent plates 343a and 343b can be configured so that a width of the one transparent plate in the sub-scanning direction is kept constant while a width of the other transparent plate in the sub-scanning direction gradually decreases in the direction away from the LED chips 342. In the latter case, the light incident face of the transparent plate 343b has a narrower width than that of the light outgoing face of the transparent plate 343a. In either case, since a width in the sub-scanning direction of the light emitted by the LED chips 342 is gradually sharpened, illumination having a narrower width in the sub-scanning direction can be realized.

Furthermore, also in the case where using two transparent plates for making light emitted from the LED chips 342 expand in the main scanning direction, a refractive index of part in at least one of the transparent plates 343a and 343b can be varied by forming a plurality of cavities therein. In this case, even when both of the light outgoing face of the transparent plate 343a and the light incident face of the transparent plate 343b are flat, illumination efficiency can be improved due to diffusion of light by the cavities. Each of the cavities can have, for example, a cylindrical shape or a triangular prism shape extending in the sub-scanning direction. In the case where the cavity has a triangular prism shape, the cavities are formed so that one side face is opposed to the light incident face of the transparent plate 343a and an edge (corresponding to one summit of a triangular cross-section) opposing the side face is closed to the light incident face than the side face. In this way, by providing the cavities having a pillar shape extending in the sub-scanning direction in at least one of the transparent plates 343a and 343b, light is diffused while passing therethrough, leading to improvement of illumination efficiency and uniformity of illumination light in the main scanning direction.

In addition, also in the modifications of Example 11, if concavities are formed on the substrate 341 and light diffusing elements are then attached onto the bottom faces of the concavities after the bottom faces and the peripheries of the concavities are made to be mirror faces or reflective faces the uniformity of the illumination light in the main scanning direction as well as the illumination efficiency can be improved.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A direct contact type image sensor unit comprising:
   an optical fiber array including a plurality of optical fibers;
   a transparent plate placed so as to be in contact with the optical fiber array, said transparent plate having two end faces;
   a pair of opaque substrates placed so as to interpose the optical fiber array and the transparent plate therebetween;
   light emitting means comprising a guide made of a light transmitting material extending in a first direction, having a side face and at least one end face and a light diffusing section formed on part of the side face of the guide for diffusing light incident thereon, for allowing light to:
   a. be incident on the transparent plate from one of the two end faces of the transparent plate; and
   b. enter interior of the guide from the at least one end face of the guide;
   a light blocking layer formed on the other of the two end faces of the transparent plate; and
   a light receiving element array including a plurality of light receiving elements provided on one end of the plurality of optical fibers,
   wherein at least part of the light entering the interior of the guide emits from part of the side face of the guide facing the light diffusing section, and emits linear illumination light along the first direction.

2. A direct contact type image sensor unit according to claim 1, wherein each of the plurality of optical fibers has a core, a cladding layer provided on an outer surface of the core, and a light absorbing layer provided on an outer surface of the cladding layer.

3. A direct contact type image sensor unit according to claim 1, further comprising lens means disposed between one of the two end faces of the transparent plate and the light emitting means,
   wherein the lens means converges the illumination light only in a second direction perpendicular to the first direction.

4. A direct contact type image sensor unit according to claim 3, wherein a refractive index of the lens means is substantially the same as that of the transparent plate.

5. A direct contact type image sensor unit according to claim 4, wherein the lens means is connected to the transparent plate using a transparent resin having substantially the same refractive index as those of the lens means and the transparent plate, while optically matching the lens means and the transparent plate.

6. A direct contact type image sensor unit according to claim 3, wherein the lens means and the transparent plate are made of the same material.

7. A direct contact type image sensor unit according to claim 1, wherein the guide of the linear illumination device has two end faces, a cross-section of the guide perpendicularly crossing the first direction being similar to that of each of the two end faces, an area of the cross-section of the guide gradually decreasing as approaching a central portion from the two end faces, and
   wherein the light emitting means allows the light to enter the guide from the both end faces, and the light diffusing layer is formed in the first direction as one continuous part.

8. A direct contact type image sensor unit according to claim 7, wherein a width of the light diffusing layer in a second direction perpendicular to the first direction gradually increasing as approaching the central portion between the two end faces of the guide.

9. A direct contact type image sensor unit according to claim 7, wherein a width of the light diffusing layer in a second direction perpendicular to the first direction is constant.

10. A direct contact type image sensor unit according to claim 7, wherein a side of the guide contains a straight line which is obtained by connecting corresponding points of the two end faces and substantially parallel to the first direction, a vicinity of the straight line of the side faces one of the two end faces of the transparent plate, and the illumination light is emitted from the vicinity of the straight line.

11. A direct contact type image sensor unit according to claim 7, wherein the guide has a circular cross-section.

12. A direct contact type image sensor unit according to claim 1, wherein the guide has two end faces and a pillar shape extending in the first direction and a constant shape of a cross-section perpendicularly crossing the first direction, and
   wherein the light emitting means allows the light to enter interior of the guide from both two end faces, and the light diffusing layer is formed in the first direction as one continuous part.

13. A direct contact type image sensor unit according to claim 12, wherein a width in a second direction perpendicularly crossing the first direction of the light diffusing layer gradually increases as approaching a central portion of the guide between the end faces to be maximum in the central portion.

14. A direct contact type image sensor unit according to claim 12, wherein a width in a second direction perpendicularly crossing the first direction of the light diffusing layer is constant.

15. A direct contact type image sensor unit according to claim 12, wherein a cross-section of the guide perpendicularly crossing the first direction is circular.

16. A direct contact type image sensor unit according to claim 1, wherein a refractive index of the guide of the linear illumination device is substantially equal to that of the transparent plate.

17. A direct contact type image sensor unit according to claim 1, wherein a material of the transparent plate is the same as the light transmitting material forming the guide of the linear illumination device.

18. A direct contact type image sensor unit according to claim 1, wherein the linear illumination device is connected to the transparent plate using a transparent resin having substantially the same refractive index as those of the guide and the transparent plate, while optically matching the guide and the transparent plate.

19. A direct contact type image sensor unit according to claim 1, wherein the light emitting means has at least one light emitting diode.

20. A direct contact type image sensor unit according to claim 1, wherein the light emitting means has three light emitting diodes respectively emitting red light, green light and blue light.

21. A direct contact type image sensor unit according to claim 1, wherein an angle at which the illumination light from the linear illumination device is incident on the document is in the range of 0 to 50 degrees.

* * * * *